(12) United States Patent
Xu

(10) Patent No.: US 12,439,458 B2
(45) Date of Patent: Oct. 7, 2025

(54) METHOD FOR 2-STEP RANDOM ACCESS MESSAGE A RESOURCE CONFIGURATION AND TERMINAL DEVICE

(71) Applicant: GUANGDONG OPPO MOBILE TELECOMMUNICATIONS CORP., LTD., Guangdong (CN)

(72) Inventor: Weijie Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 363 days.

(21) Appl. No.: 17/860,795

(22) Filed: Jul. 8, 2022

(65) Prior Publication Data

US 2022/0346158 A1 Oct. 27, 2022

Related U.S. Application Data

(63) Continuation of application No. PCT/CN2020/072874, filed on Jan. 17, 2020.

(51) Int. Cl.
*H04W 74/0833* (2024.01)
*H04W 56/00* (2009.01)
(Continued)

(52) U.S. Cl.
CPC ... *H04W 74/0841* (2013.01); *H04W 56/0045* (2013.01); *H04W 74/002* (2013.01);
(Continued)

(58) Field of Classification Search
CPC ......... H04W 56/0045; H04W 74/0836; H04W 74/0841; H04W 74/0866
See application file for complete search history.

(56) References Cited

U.S. PATENT DOCUMENTS

2014/0301330 A1 10/2014 Lee et al.
2021/0378031 A1* 12/2021 Chai ................. H04W 74/0866
(Continued)

FOREIGN PATENT DOCUMENTS

| CN | 101562897 B | 11/2010 |
| CN | 110312312 A | 10/2019 |
| CN | 110536475 A | 12/2019 |

OTHER PUBLICATIONS

3rd Generation Partnership Project (3GPP) Technical Specification (TS) 38.321 version 15.8.0 Release 15. (Year: 2020).*
(Continued)

*Primary Examiner* — Ayaz R Sheikh
*Assistant Examiner* — Christopher R Davis
(74) *Attorney, Agent, or Firm* — Young Basile Hanlon & MacFarlane, P.C.

(57) ABSTRACT

Methods for 2-step random access (RA) message (MSG) A resource configuration and a terminal device are provided. The method includes receiving first configuration information from a network device. The first configuration information includes a physical random access channel (PRACH) resource configuration of a 2-step RA MSG A resource, physical uplink shared channel (PUSCH) resource configurations of the 2-step RA MSG A resource, and a correspondence between a PRACH time-domain resource configuration and the PUSCH resource configurations. The PRACH resource configuration includes the PRACH time-domain resource configuration, and the PRACH time-domain resource configuration is for determining random access channel (RACH) occasion (RO) time-domain resource locations. The correspondence is for constraining PUSCH occasions (POs) corresponding to different RO time-domain resource locations to be distributed on different PUSCH
(Continued)

resource configurations during any period of time having a length equal to a length of a preamble receiving window.

15 Claims, 7 Drawing Sheets

(51) Int. Cl.
  *H04W 74/00* (2009.01)
  *H04W 74/08* (2024.01)
  *H04W 74/0836* (2024.01)
  *H04W 74/0838* (2024.01)

(52) U.S. Cl.
  CPC ... *H04W 74/0836* (2024.01); *H04W 74/0866* (2013.01); *H04W 74/0838* (2024.01)

(56) References Cited

U.S. PATENT DOCUMENTS

2022/0070941 A1* 3/2022 Farag ............... H04W 74/0833
2022/0159740 A1* 5/2022 Xiong ............... H04W 74/0833

OTHER PUBLICATIONS

3GPP TSG RAN Meeting #86, RP-193121, Change Request, âIntroduction of two-step RACH in NR.â (Year: 2019).*
Communication pursuant to Article 94(3) EPC for EP Application 20914439.3 mailed Oct. 19, 2023. (9 pages).
Extended European Search Report for EP Application 20914439.3 mailed Dec. 6, 2022. (13 pages).
3GPP TSG RAN WG1 #96, R1-1902136, Athens, Greece, Nokia, Nokia Shanghai Bell, On 2-step RACH Procedure, Feb. 25-Mar. 1, 2019. (10 pages).
3GPP TSG RAN WG1 #98, R1-1909222, Prague, Czech, OPPO, On Channel Structure for 2-step RACH, Aug. 26-30, 2019. (14 pages).
International Search Report and Written Opinion with English Translation for International Application No. PCT/CN2020/072874 Oct. 21, 2020.
3GPP TSG RAN WG1 #96bis R1-1904715; Xi'an, China, Apr. 8-12, 2019.
3GPP TSG RAN WG1 Meeting #97 R1-1907256; May 13-May 17, 2019; Reno, USA.
3GPP TSG RAN WG1 Meeting #97 R1-1907691; May 13-May 17, 2019; Reno, USA.

* cited by examiner (A) CONTENTION-BASED RA (B) NON-CONTENTION-BASED RA

METHOD FOR 2-STEP RANDOM ACCESS MESSAGE A RESOURCE CONFIGURATION AND TERMINAL DEVICE

CROSS-REFERENCE TO RELATED APPLICATION(S)

This application is a continuation of International Application No. PCT/CN2020/072874, filed on Jan. 17, 2020, the entire disclosure of which is hereby incorporated by reference.

TECHNICAL FIELD

The disclosure relates to the field of communication technology, and more particularly to methods for 2-step random access (RA) message (MSG) A resource configuration and a terminal device.

BACKGROUND

At present, a new radio (NR) system has a relatively small coverage, and signal transmission delays between user equipments (UEs) at different locations in a same cell and a base station are little different. When UEs transmit preambles during random access (RA), the preambles transmitted by different UEs through using a same random access channel (RACH) time-frequency resource (i.e., a same RACH occasion (RO)) each arrive the base station within an RO time. Once the base station receives a preamble transmitted by a UE, the base station then can know a point of time at which the UE transmits the preamble, and can determine a timing advance (TA) of the UE and a random access radio network temporary identifier (RA-RNTI) used by the UE to transmit a random access response (RAR).

Compared with a cellular network used by a conventional NR, signal transmission delays between UEs and a satellite in a non-terrestrial network (NTN) are greatly increased. In addition, the satellite has a great coverage, for different UEs within a same satellite coverage, since the UEs are located at different locations, signal transmission delays between the UEs and the satellite may be greatly different. According to discussion for NTN application scenarios during release-16 (Rel-16) standardization, a maximum difference of signal transmission delays between different UEs and a base station in an NTN cell is 10.3 milliseconds (ms). Such great signal transmission delay difference may result in that preambles transmitted by different UEs that use a same RACH resource for preamble transmission arrive the base station at different times. For ensuring that the base station can receive preambles transmitted by different UEs in the cell, a length of a preamble receiving window at the base station may be extended to 2*(a maximum one-way delay-a minimum one-way delay), and as illustrated in FIG. 1A, an RO represents an RACH occasion.

The base station needs to know an RO in which a UE transmits a preamble in response to reception of the preamble, and then determines an initial TA of the UE. In the NTN, since a relatively long preamble receiving window needs to be introduced, if a time interval between ROs adjacent in a time domain is less than a length of the preamble receiving window, there may be a problem that preamble receiving windows corresponding to ROs at different times overlap in time as illustrated in FIG. 1B. As such, when the base station receives a preamble in an overlap of the preamble receiving windows, the base station does not know that the preamble is transmitted in which RO (RO1 or RO2), and then cannot determine a TA of the UE.

For possible preamble receiving window blur at a network side in the NTN, it is necessary to formulate a corresponding solution at a standard level.

SUMMARY

Methods for 2-step random access (RA) message (MSG) A resource configuration and a terminal device are provided in implementations of the disclosure.

In a first aspect, a method for 2-step RA MSG A resource configuration is provided in implementations of the disclosure. The method includes the following.

A terminal device receives first configuration information from a network device. The first configuration information includes a physical random access channel (PRACH) resource configuration of a 2-step RA MSG A resource, physical uplink shared channel (PUSCH) resource configurations of the 2-step RA MSG A resource, and a correspondence between a PRACH time-domain resource configuration and the PUSCH resource configurations. The PRACH resource configuration includes the PRACH time-domain resource configuration, and the PRACH time-domain resource configuration is for determining random access channel (RACH) occasion (RO) time-domain resource locations. The correspondence is for constraining PUSCH occasions (POs) corresponding to different RO time-domain resource locations to be distributed on different PUSCH resource configurations during any period of time having a length equal to a length of a preamble receiving window.

In a second aspect, a method for 2-step RA MSG A resource configuration is provided in implementations of the disclosure. The method includes the following.

A network device transmits first configuration information to a terminal device. The first configuration information includes a PRACH resource configuration of a 2-step RA MSG A resource, PUSCH resource configurations of the 2-step RA MSG A resource, and a correspondence between a PRACH time-domain resource configuration and the PUSCH resource configurations. The PRACH resource configuration includes the PRACH time-domain resource configuration, and the PRACH time-domain resource configuration is for determining RO time-domain resource locations. The correspondence is for constraining POs corresponding to different RO time-domain resource locations to be distributed on different PUSCH resource configurations during any period of time having a length equal to a length of a preamble receiving window.

In a third aspect, a terminal device is provided. The terminal device includes a transceiver, a processor, and a memory storing a computer program. The computer program is executed by the processor to cause the transceiver to receive first configuration information from a network device. The first configuration information includes a PRACH resource configuration of a 2-step RA MSG A resource, PUSCH resource configurations of the 2-step RA MSG A resource, and a correspondence between a PRACH time-domain resource configuration and the PUSCH resource configurations. The PRACH resource configuration includes the PRACH time-domain resource configuration, and the PRACH time-domain resource configuration is for determining RO time-domain resource locations. The correspondence is for constraining POs corresponding to different RO time-domain resource locations to be distributed on different PUSCH resource configurations during any period of time having a length equal to a length of a preamble receiving window.

BRIEF DESCRIPTION OF DRAWINGS

The following will give a brief introduction to the accompanying drawings used for illustrating implementations or the related art.

DETAILED DESCRIPTION

The following will describe technical solutions of implementations in the disclosure with reference to accompanying drawings.

Figure 1A:
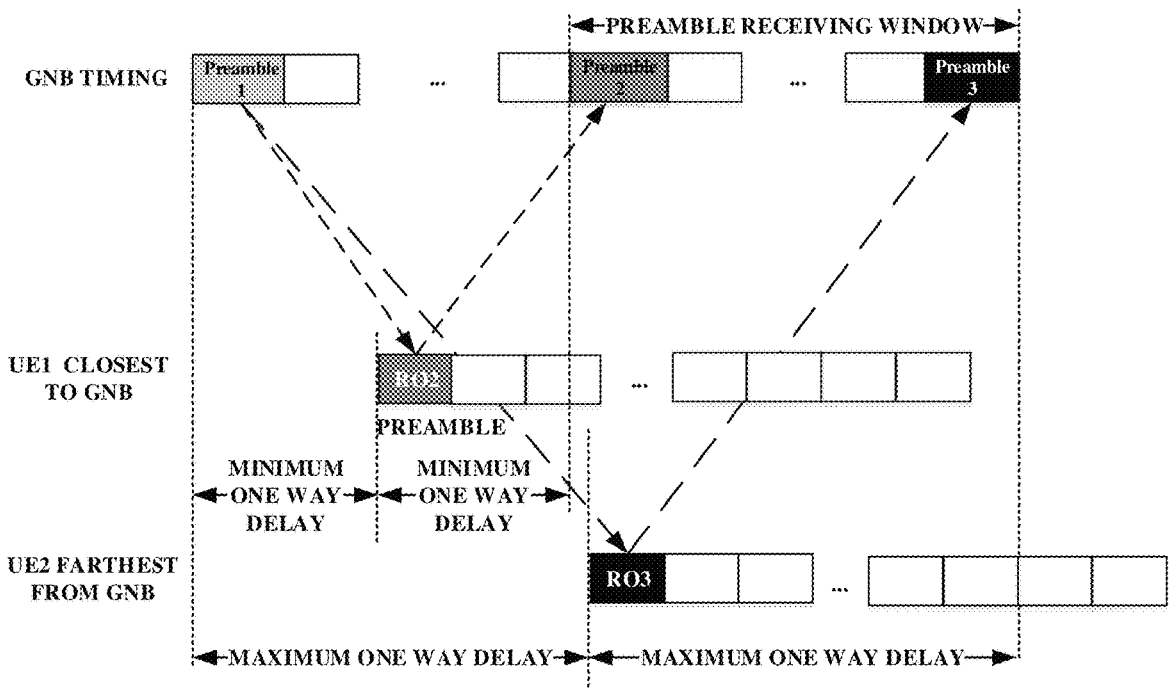
FIG. 1A is a schematic diagram illustrating a preamble receiving window provided in implementations of the disclosure.
Figure 1B:
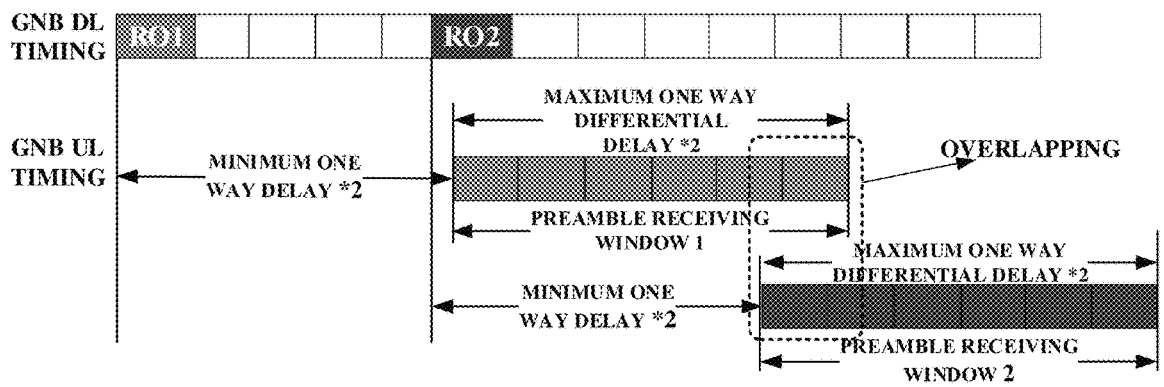
FIG. 1B is a schematic diagram illustrating overlapping of preamble receiving windows on a transmission resource provided in implementations of the disclosure.
Figure 1C:
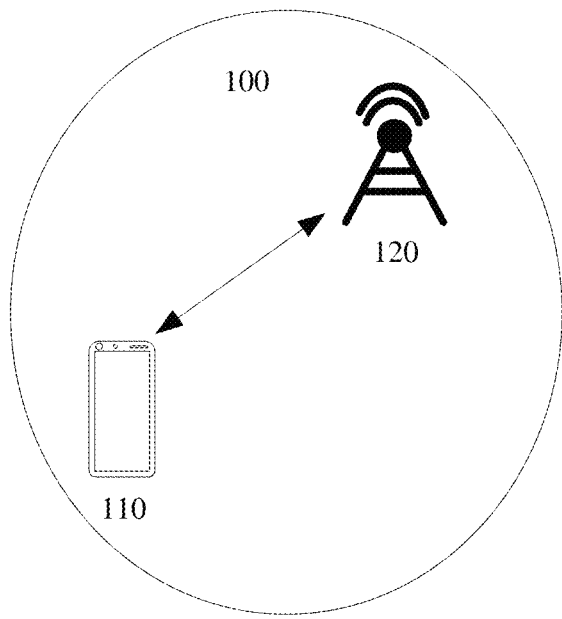
FIG. 1C is a system architecture diagram illustrating an exemplary communication system provided in implementations of the disclosure.

The technical solutions of implementations in the disclosure can be applied to an exemplary communication system 100 as illustrated in FIG. 1C, and the exemplary communication system 100 includes a terminal device 110 and a network device 120, where the terminal device 110 communicates with the network device 120.

The exemplary communication system 100 for example may be: a non-terrestrial network (NTN) system, a global system of mobile communication (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a future 5th generation (5G) system, or a new radio (NR).

The terminal device 110 in implementations of the disclosure may refer to a user equipment (UE), an access terminal, a subscriber unit, a subscriber station, a mobile station, a mobile platform, a remote station, a remote terminal, a mobile device, a user terminal, a terminal, a wireless communication device, a user agent, or a user apparatus. The terminal device also may be a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, a relay device, an in-vehicle device, a wearable device, a terminal device in the future 5G network, a terminal device in a future evolved public land mobile network (PLMN), or the like, which will not be limited herein.

The network device 120 in implementations of the disclosure can communicate with the terminal device. The network device may be a base transceiver station (BTS) in the GSM or CDMA system, a NodeB (NB) in the WCDMA system, an evolved NodeB (eNB or eNodeB) in the LTE system, or a radio controller in a cloud radio access network (CRAN) scenario. Alternatively, the network device also may be a relay device, an access point (AP), an in-vehicle device, a wearable device, a network device in the future 5G network, a network device in the future evolved PLMN, or one antenna panel or one group of antenna panels (including multiple antenna panels) in a base station in the 5G system. Alternatively, the network device also may be a network node constructing a next generation NodeB (gNB) or a transmission point (TP), such as a baseband unit (BBU), a distributed unit (DU), or the like, which will not be limited herein.

In some deployments, the gNB may include a centralized unit (CU) and a DU. The gNB also may include an active antenna unit (AAU). The CU achieves a part of functions of the gNB, and the DU achieves a part of functions of the gNB. For example, the CU is responsible for processing non-real-time protocols and services, to achieve functions of a radio resource control (RRC) layer and a packet data convergence protocol (PDCP) layer. The DU is responsible for processing physical (PHY)-layer protocols and real-time services, to achieve functions of a radio link control (RLC) layer, a medium access control (MAC) layer, and a PHY layer. The AAU achieves a part of processing functions of the PHY layer and related functions of radio frequency (RF) processing and active antennas. Since information of the RRC layer may be finally converted into information of the PHY layer or be obtained by transforming the information of the PHY layer, in this architecture, high-layer signaling, such as RRC-layer signaling, also can be considered as transmitted by the DU or by a combination of the DU and the AAU. It can be understood that, the network device may be a device that includes at least one of a CU node, a DU node, or an AAU node. In addition, the CU can be considered as a network device in an RAN or in a core network (CN), which will not be limited herein.

In implementations of the disclosure, the terminal device 110 or the network device 120 includes a hardware layer, an operating system layer running above the hardware layer, and an application layer running above the operating system layer. The hardware layer includes a central processing unit (CPU), a memory management unit (MMU), a memory (also called main memory), or other hardware. The operating system may be any one or various computer operating systems that achieve service processing through processes, e.g., a Linux® operating system, a Unix® operating system, an Android® operating system, an iOS® operating system, a Windows® operating system, or the like. The application layer includes a browser, an address book, a word processing software, an instant messaging software, or other applications. Furthermore, a specific structure of the execution body of the method provided in implementations of the disclosure is not particularly limited herein, as long as the execution body can perform communication according to the method provided in implementations of the disclosure by running a program containing codes for realizing the method provided in implementations of the disclosure. For example, the execution body of the method provided in implementations of the disclosure may be a terminal device or a function module that is in the terminal device and can invoke and execute the program.

At present, a third generation partnership project (3GPP) is researching an NTN technology. NTN generally provides communication services to ground users with satellite communication. Compared with terrestrial cellular network communication, the satellite communication has many unique advantages. At first, the satellite communication is not limited by user regions. For example, general land communication cannot cover areas where communication devices cannot be set up such as oceans, mountains, or deserts, or where communication coverage is not provided due to a sparse population. However, for the satellite communication, theoretically every corner of the earth can be covered by the satellite communication because a satellite can cover a larger ground and further can orbit around the earth. Then the satellite communication has a greater society value. The satellite communication can cover at a lower cost remote mountainous areas and poor and backward countries or regions, so that people in these regions can enjoy an advanced voice communication and mobile Internet technology, which is conducive to narrowing a digital divide with developed regions and promoting development of these regions. Furthermore, a satellite communication distance is long, and a communication cost does not increase obviously when the communication distance increases. Finally, the satellite communication is more stable and not limited by natural disasters.

A communication satellite can be classified into a low-earth orbit (LEO) satellite, a medium-earth orbit (MEO) satellite, a geostationary earth orbit (GEO) satellite, a high elliptical orbit (HEO) satellite, or the like according to different orbit altitudes. At present, an LEO satellite and a GEO satellite are mainly researched.

1. LEO

An altitude of an LEO satellite ranges from 500 kilometers (km) to 1500 km, and a corresponding orbital period is about 1.5 hours (h) to 2 h. A signal transmission delay of single-hop communication between users is generally less than 20 millisecond (ms). A maximum satellite viewing time is 20 minutes. A signal transmission distance is short, a link loss is small, and a transmission power requirement for a user terminal is not high.

2. GEO

An orbit altitude of a GEO satellite is 35786 km, and a rotation period around the earth is 24 h. A signal transmission delay of single-hop communication between users is generally 250 ms.

In order to ensure coverage of a satellite and improve a system capacity of an entire satellite communication system, the satellite uses multiple beams to cover the ground. A satellite can form dozens or even hundreds of beams to cover the ground, and a satellite beam can cover a ground area of tens to hundreds of kilometers in diameter.

The following may be triggered during NR random access (RA).
 (1) Radio connection establishment when a UE performs initial access: the UE switches from a radio resource control (RRC) idle (RRC_IDLE) state to an RRC connected (RRC_CONNECTED) state.
 (2) RRC connection reestablishment: RRC connection reestablishment is conducive for the UE to reestablishing a radio connection in response to a radio link failure.
 (3) Handover: the UE needs to establish uplink (UL) synchronization with a new cell.
 (4) In the RRC_CONNECTED state, downlink (DL) data arrives, and in this case, UL is in an out-of-synchronization state.
 (5) In the RRC_CONNECTED state, UL data arrives, and in this case, UL is in an out-of-synchronization state or has no physical uplink control channel (PUCCH) resource for scheduling request (SR) transmission.
 (6) SR failure.
 (7) A synchronization reconfiguration request from RRC.
 (8) A UE switches from an RRC inactive (RRC_INACTIVE) state to an RRC_CONNECTED state.
 (9) Time calibration establishment during secondary cell (SCell) adding.
 (10) A request for other scheduling indications (SIs).
 (11) Beam failure recovery.

Figure 1D:
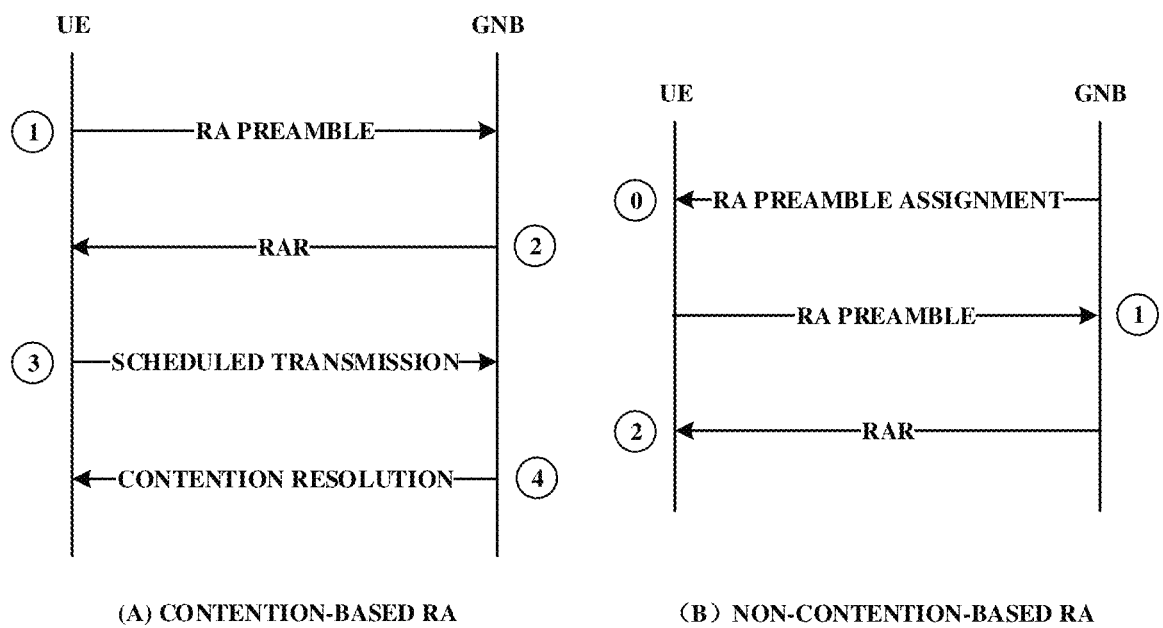
FIG. 1D is a schematic diagram illustrating a contention-based random access (RA) mode and a non-contention-based RA mode in a new radio (NR) release-15 (Rel-15) provided in implementations of the disclosure.

In an NR release 15 (Rel-15), two 4-step RA modes are mainly supported, i.e., a contention-based RA mode and a non-contention-based RA mode, as illustrated in FIG. 1D. As illustrated in FIG. 1D, the contention-based RA procedure is divided into 4 steps, and the non-contention-based RA procedure is divided into 2 steps, where detailed steps are as follows.
 1. A terminal device transmits message (MSG) 1 to a network.

The terminal device selects a physical random access channel (PRACH) resource and transmits a preamble selected on the PRACH resource selected. The PRACH resource and the preamble can be assigned by a base station if there is the non-contention-based RA. The base station can estimate, according to the preamble, UL timing and a size of a grant needed for MSG 3 transmission by the terminal device.
 2. The network transmits a random access response (RAR) to the terminal device.

The terminal device activates an RA-response window in response to transmission of the MSG 1, and monitors within the window a physical downlink control channel (PDCCH) scrambled by a random access radio network temporary identifier (RA-RNTI). The RA-RNTI is computed as follows.

RA-RNTI=1+s_id+14×t_id+14×80×f_id+14×80×8×ul_carrier_id, where s_id represents an index of a first orthogonal frequency division multiplexing (OFDM) symbol of a PRACH occasion (PO) ($0 \leq s\_id < 14$), t_id represents an index of a first slot of a PO in a system frame ($0 \le t\_id < 80$), f_id represents an index of a PO in a frequency domain ($0 \le f\_id < 8$), and ul_carrier_id represents a UL carrier for preamble transmission (0 represents a normal UL carrier, and 1 represents a supplementary uplink (SUL) carrier).

That is, the RA-RNTI is related to a PRACH time-frequency resource that is used for transmission of the MSG 1 by the UE.

The terminal device can obtain a physical downlink shared channel (PDSCH) scheduled by the PDCCH in response to successful reception of the PDCCH scrambled by the RA-RNTI, where the PDSCH contains an RAR. The RAR contains the following information. A sub-header of the RAR contains a back-off indicator (BI) indicating a fallback time of MSG 1 retransmission. RA preamble identifier (RAPID) in the RAR: the RAPID is a preamble index received by a network response. A payload of the RAR contains a tag for adjusting UL timing. UL grant: the UL grant is a UL resource indication for scheduling MSG 3. Temporary cell-radio network temporary identifier (C-RNTI): the temporary C-RNTI is for scrambling a PDCCH of MSG 4 (at initial access).

The terminal device determines that the RAR is successfully received if the terminal device receives the PDCCH scrambled by the RA-RNTI and the RAR contains an index of a preamble transmitted by the terminal device.

For the non-contention-based RA, the RA procedure ends in response to successful reception of MSG 2 by the terminal device. For the contention-based RA, the terminal device further needs to perform MSG 3 transmission and MSG 4 reception in response to successful reception of the MSG 2.

3. The terminal device transmits MSG 3 on a network scheduled resource.

The MSG 3 is mainly used to inform the network of a type of an event that triggers a random access channel (RACH) procedure. For example, a UE identifier (ID) and an establishment cause may be carried in the MSG 3 if there is an initial access random procedure, or a connected-UE ID and an establishment cause may be carried in the MSG 3 if there is an RRC reestablishment.

4. The network transmits MSG 4 to the terminal device.

The MSG 4 has two functions of which one is for contention resolution and the other is for RRC configuration message transmission from the network to the terminal device. The contention resolution has two manners: one is that the MSG 4 is scheduled by a PDCCH scrambled by a C-RNTI if the UE makes the MSG 3 carry the C-RNTI, and the other is that the MSG 4 is scheduled by a PDCCH scrambled by a temporary C-RNTI if the UE makes the MSG 3 carry no C-RNTI, e.g., initial access. The contention resolution is that the UE receives a PDSCH for the MSG 4 and matches a common control channel (CCCH) service data unit (SDU) in the PDSCH.

As can be seen from the above RA, a main purpose of the RA is that the terminal device obtains UL synchronization with a cell. During the RA, the network can determine a point of time at which the terminal device transmits a preamble according to an RACH time-domain resource used for receiving the preamble from the terminal device, determine an initial TA of the terminal device according to the point of time for transmitting the preamble and a point of time for receiving the preamble, and inform the terminal device through an RAR.

Figure 1E:
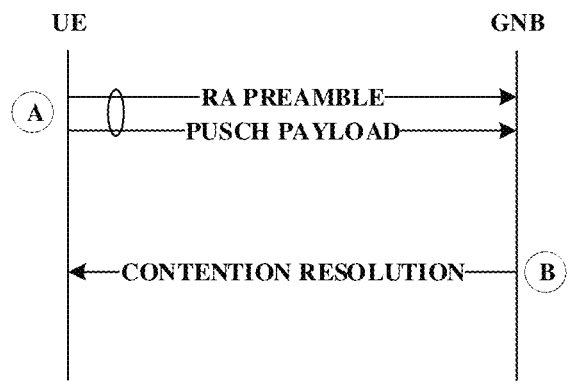
FIG. 1E is a schematic diagram illustrating successful 2-step RA contention resolution in a release-16 (Rel-16) provided in implementations of the disclosure.
Figure 1F:
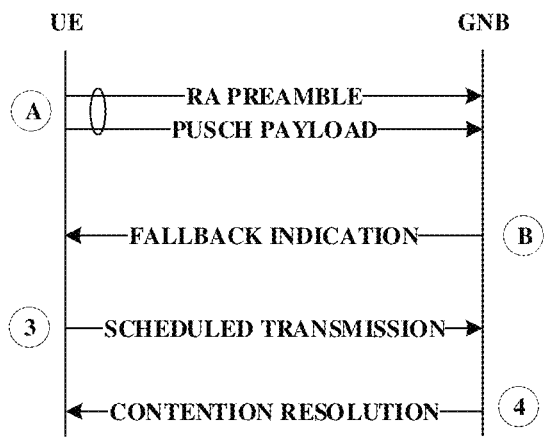
FIG. 1F is a schematic diagram illustrating 2-step RA including a fallback procedure in a Rel-16 provided in implementations of the disclosure.

At present, the 2-step RA is in a Rel-16 standardization discussion, and introduction of the 2-step RA can reduce both delays and signaling overheads. MSG A in the 2-step RA contains a preamble transmitted on a PRACH and payload information transmitted on a PUSCH. The terminal device monitors a response at a network side within a configured window in response to transmission of the MSG A. The terminal device ends the RA if receiving an indication indicating successful contention resolution transmitted by the network, as illustrated in FIG. 1E. The terminal device performs MSG 3 transmission and monitors a contention resolution result if receiving a fallback indication in MSG B, as illustrated in FIG. 1F. The terminal device continues transmission of the MSG A if contention resolution fails in response to MSG 3 transmission.

In NR, a MSG A resource configuration in the 2-step RA includes a PRACH resource configuration and a PUSCH resource configuration.

The PRACH resource configuration of the MSG A includes a PRACH time-frequency resource configuration and a start-preamble root sequence configuration.

A PRACH time-domain resource configuration is indicated by an RACH configuration index. A PRACH resource period can be obtained with the RACH configuration index. The PRACH resource period contains the number of RACH occasions (ROs), a lasting time of each RO, or the like.

A PRACH frequency-domain resource configuration contains an RACH start frequency-domain resource index and the number of RACH resources (i.e., the number of consecutive RACH frequency-domain resources) that can be used for frequency division multiplexing at a same point of time. A PRACH frequency-domain resource can be determined as a consecutive frequency-domain resource according to the PRACH frequency-domain resource configuration.

Each cell broadcasts a start-preamble root sequence, and based on the start-preamble root sequence configured, an available preamble set for the cell can be obtained through cyclic shift.

A PUSCH configuration for the MSG A contains the following.

① A time offset indicating a time offset of a PO slot relative to an RO slot.

② A modulation and coding scheme (MCS) and a transport block size (TBS) supported by a PO.

③ A PUSCH time-domain resource indicating a PO distribution within a slot.

④ A PUSCH frequency-domain resource configuration indicating a PO start frequency-domain resource index (a physical resource block (PRB) index), the number of PRBs occupied by each PO in a frequency domain, a frequency-domain gap between different POs in the frequency domain, or the number of POs for frequency division multiplexing.

Based on the above technical background and the technical problem of the disclosure, a method for 2-step RA MSG A resource configuration is provided in implementations of the disclosure, which will be illustrated below in detail with a combination of accompanying drawings.

Figure 2A:
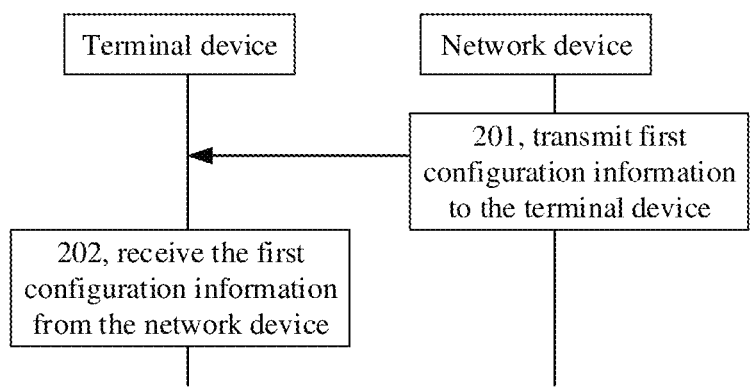
FIG. 2A is a schematic flow chart illustrating a method for 2-step RA message (MSG) A resource configuration provided in implementations of the disclosure.

Referring to FIG. 2A, FIG. 2A is a schematic flow chart illustrating a method for 2-step RA MSG A resource configuration provided in implementations of the disclosure, the method includes the following.

At 201, a network device transmits first configuration information to a terminal device. The first configuration information includes a PRACH resource configuration of a 2-step RA MSG A resource, PUSCH resource configurations of the 2-step RA MSG A resource, and a correspondence between a PRACH time-domain resource configuration and the PUSCH resource configurations. The PRACH resource configuration includes the PRACH time-domain resource configuration, and the PRACH time-domain resource configuration is for determining RO time-domain resource locations. The correspondence is for constraining POs corresponding to different RO time-domain resource locations to be distributed on different PUSCH resource configurations during any period of time having a length equal to a length of a preamble receiving window.

The PRACH resource configuration includes a single PRACH resource configuration, and the PUSCH resource configurations include at least two PUSCH resource configurations, where the at least two PUSCH resource configurations are non-overlapping mutually.

The preamble receiving window illustrated in the disclosure is also called an RACH receiving window, which specifically refers to a time-domain resource for preamble reception by the network device, where the time-domain resource is preconfigured by a network side according to a protocol.

At 202, the terminal device receives the first configuration information from the network device. The first configuration information includes the PRACH resource configuration of the 2-step RA MSG A resource, the PUSCH resource configurations of the 2-step RA MSG A resource, and the correspondence between the PRACH time-domain resource configuration and the PUSCH resource configurations. The PRACH resource configuration includes the PRACH time-domain resource configuration, and the PRACH time-domain resource configuration is for determining the RO time-domain resource locations.

It can be seen that, in implementations of the disclosure, the first configuration information is synchronized between the network device and the terminal device. The first configuration information includes the PRACH resource configuration of the 2-step RA MSG A resource, the PUSCH resource configurations of the 2-step RA MSG A resource, and the correspondence between the PRACH time-domain resource configuration and the PUSCH resource configurations. The PRACH resource configuration includes the PRACH time-domain resource configuration, and the PRACH time-domain resource configuration is for determining the RO time-domain resource locations. Since the correspondence can be used to constrain POs corresponding to different RO time-domain resource locations to be distributed on different PUSCH resource configurations during any period of time having a length equal to the length of the preamble receiving window, a PO corresponding to a preamble received within an overlap of preamble receiving windows is only associated with a single determined RO time-domain resource location, which can avoid that the PO associated with the preamble received within the overlap of the preamble receiving windows corresponds to multiple ROs, thereby effectively solving preamble receiving window blur at a network side.

In a possible implementation, the first configuration information is a cell public configuration, and the first configuration information is carried by a system message.

For example, the first configuration information can be carried in a system information block x (SIBx) (1≤x).

As can be seen in the example, the first configuration information can be configured by multiplexing the system message.

In possible implementations, the PRACH resource configuration further includes a PRACH frequency-domain resource configuration indicating a consecutive PRACH frequency-domain resource.

The PRACH resource configuration is a single PRACH resource configuration and includes the PRACH time-domain resource configuration and the PRACH frequency-domain resource configuration, and the PRACH time-domain resource indicates a PRACH-resource distribution in a time domain, such that each RO time-domain resource location can be determined. The PRACH frequency-domain resource configuration indicates the consecutive PRACH frequency-domain resource, where the consecutive PRACH frequency-domain resource may be a frequency-domain resource of one or more transport blocks, which will not be limited herein.

In possible implementations, the PUSCH resource configurations include N PUSCH resource configurations, and N is an integer greater than 1. The N PUSCH resource configurations include at least one of: the N PUSCH resource configurations corresponding to a same MCS and a same TBS, or a value of N depending on the length of the preamble receiving window and an RACH-resource distribution density in the time domain.

N may be a maximum number of ROs corresponding to different time-domain resource locations within a period of time having a length equal to the length of the preamble receiving window, e.g., 2, 3, or the like, which will not be limited herein.

In possible implementations, each RO time-domain resource location determined by the PRACH time-domain resource configuration corresponds to one of the N PUSCH resource configurations in the correspondence.

Each RO in the time domain determined by the PRACH time-domain resource configuration corresponds to one of the N PUSCH resource configurations, that is, PUSCH resources corresponding to any two different ROs are different mutually.

In a possible implementation, the N PUSCH resource configurations correspond to a same time-domain resource configuration. The N PUSCH resource configurations have frequency-domain start locations different from each other and correspond to a same or different number of PUSCH frequency-domain resources for frequency division multiplexing. Any two PUSCH resources corresponding to a same time-domain location in the N PUSCH resource configurations are non-overlapping mutually in a frequency domain.

In possible implementations, the correspondence is for constraining PO frequency-domain resource locations corresponding to different ROs to be different from each other during any period of time having a length equal to the length of the preamble receiving window.

In specific implementations, different PUSCH resource configurations corresponding to different ROs are distinguished with frequency division multiplexing.

The N PUSCH resource configurations corresponding to the same time-domain resource configuration means that a time offset between each of the N PUSCH resource configurations and an RO corresponding to each of the N PUSCH resource configurations is the same.

The corresponding PUSCH frequency-domain resources for frequency division multiplexing refer to PUSCH resources that are in a same time domain and different frequency domains, that is, the number of POs for frequency division multiplexing on a same time-domain resource may be same or different.

Figure 2B:
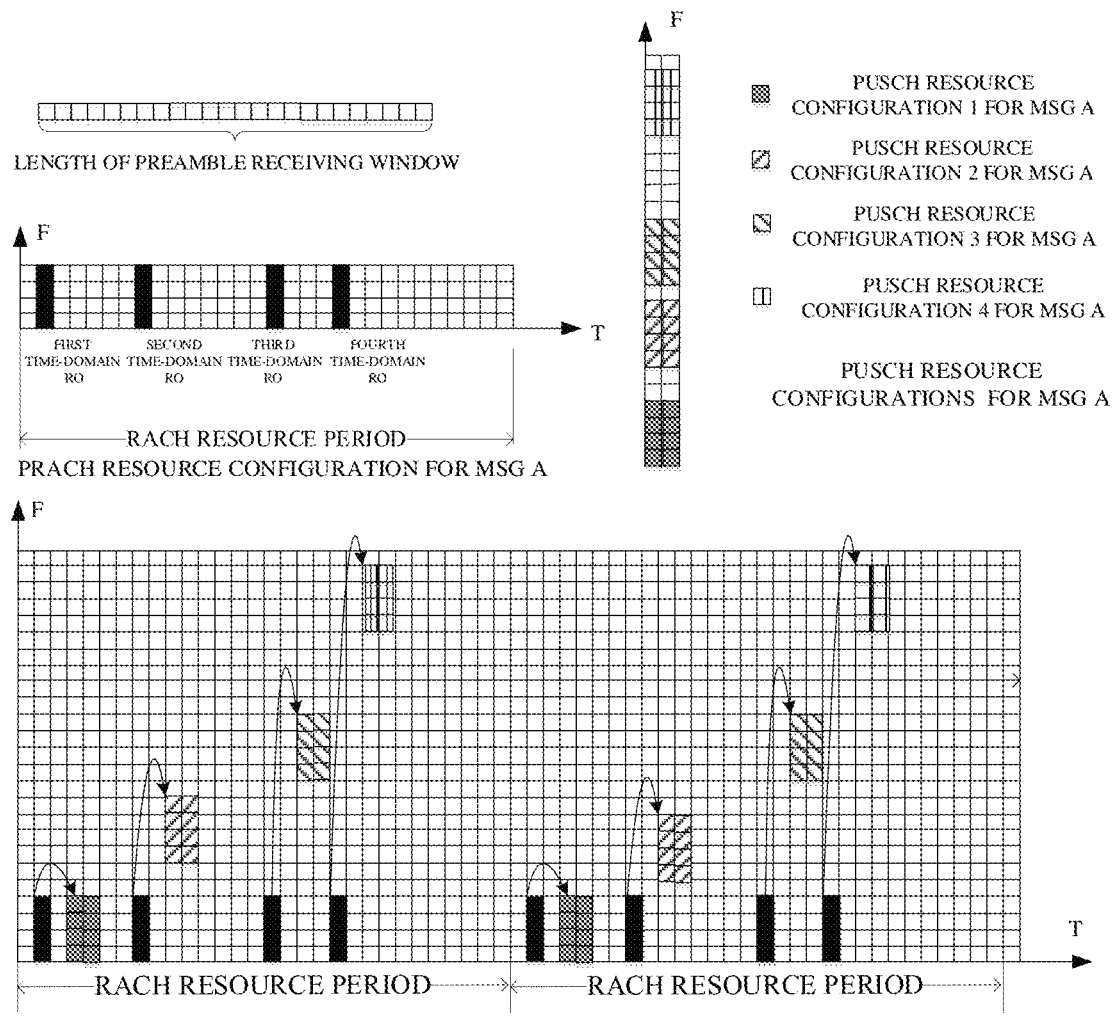
FIG. 2B is a schematic diagram illustrating a correspondence between a physical random access channel (PRACH) time-domain resource configuration and physical uplink shared channel (PUSCH) resource configurations provided in implementations of the disclosure.

For example, as illustrated in FIG. 2B, supposing that the PRACH resource configuration of the MSG A corresponds to 4 ROs in an RACH resource period, specifically a first time-domain RO, a second time-domain RO, a third time-domain RO, and a fourth time-domain RO. The PUSCH resource configurations of the MSG A include 4 PUSCH resource configurations, specifically PUSCH resource configuration 1 of the MSG A, PUSCH resource configuration 2 of the MSG A, PUSCH resource configuration 3 of the MSG A, and PUSCH resource configuration 4 of the MSG A. The PUSCH resource configuration 1 corresponds to RO1 time-domain resource location, and a time offset of the PUSCH resource configuration 1 relative to the RO1 time-domain resource location is time offset 1. The PUSCH resource configuration 2 corresponds to RO2 time-domain resource location, and a time offset of the PUSCH resource configuration 2 relative to the RO2 time-domain resource location is time offset 2. The PUSCH resource configuration 3 corresponds to RO3 time-domain resource location, and a time offset of the PUSCH resource configuration 3 relative to the RO3 time-domain resource location is time offset 3. The PUSCH resource configuration 4 corresponds to RO4 time-domain resource location, and a time offset of the PUSCH resource configuration 4 relative to the RO4 time-domain resource location is time offset 4. Time offset 1=time offset 2=time offset 3=time offset 4. The correspondence between the PRACH resource configuration and the PUSCH resource configurations specifically includes that the PUSCH resource configuration 1 of the MSG A is mapped to the first time-domain RO in the PRACH resource period, the PUSCH resource configuration 2 of the MSG A is mapped to the second time-domain RO in the PRACH resource period, the PUSCH resource configuration 3 of the MSG A is mapped to the third time-domain RO in the PRACH resource period, and the PUSCH resource configuration 4 of the MSG A is mapped to the fourth time-domain RO in the PRACH resource period.

As can be seen in the example, since any two PUSCH resources corresponding to the same time-domain location in the N PUSCH resource configurations are non-overlapping mutually in the frequency domain, a PO associated with a single preamble received within an overlap of preamble receiving windows only corresponds to a single determined RO, which can avoid that the PO associated with the preamble received within the overlap of the preamble receiving windows corresponds to multiple ROs. The network device can determine, according to a PUSCH for the MSG A received, a PRACH resource for transmitting a preamble of the MSG A by the terminal device, thereby effectively solving preamble receiving window blur at a network side.

In a possible implementation, the N PUSCH resource configurations correspond to a same frequency-domain resource configuration. The N PUSCH resource configurations correspond to different time-domain resource configurations. The N PUSCH resource configurations are non-overlapping mutually in the time domain, where non-overlapping mutually in the time domain means that time offsets of POs relative to ROs are different.

In possible implementations, the N PUSCH resource configurations corresponding to different time-domain resource configurations means that the N PUSCH resource configurations correspond to different time offsets, where each of the time offsets is a time offset of a PO slot relative to an RO slot.

In possible implementations, the N PUSCH resource configurations corresponding to different time-domain resource configurations means that the N PUSCH resource configurations correspond to different in-slot start time offsets, where each of the in-slot start time offsets is a start-symbol sequence number of a first PO within each PO slot.

In possible implementations, the correspondence is for constraining PO time-domain resource locations corresponding to different ROs to be different from each other during any period of time having a length equal to the length of the preamble receiving window.

Figure 2C:
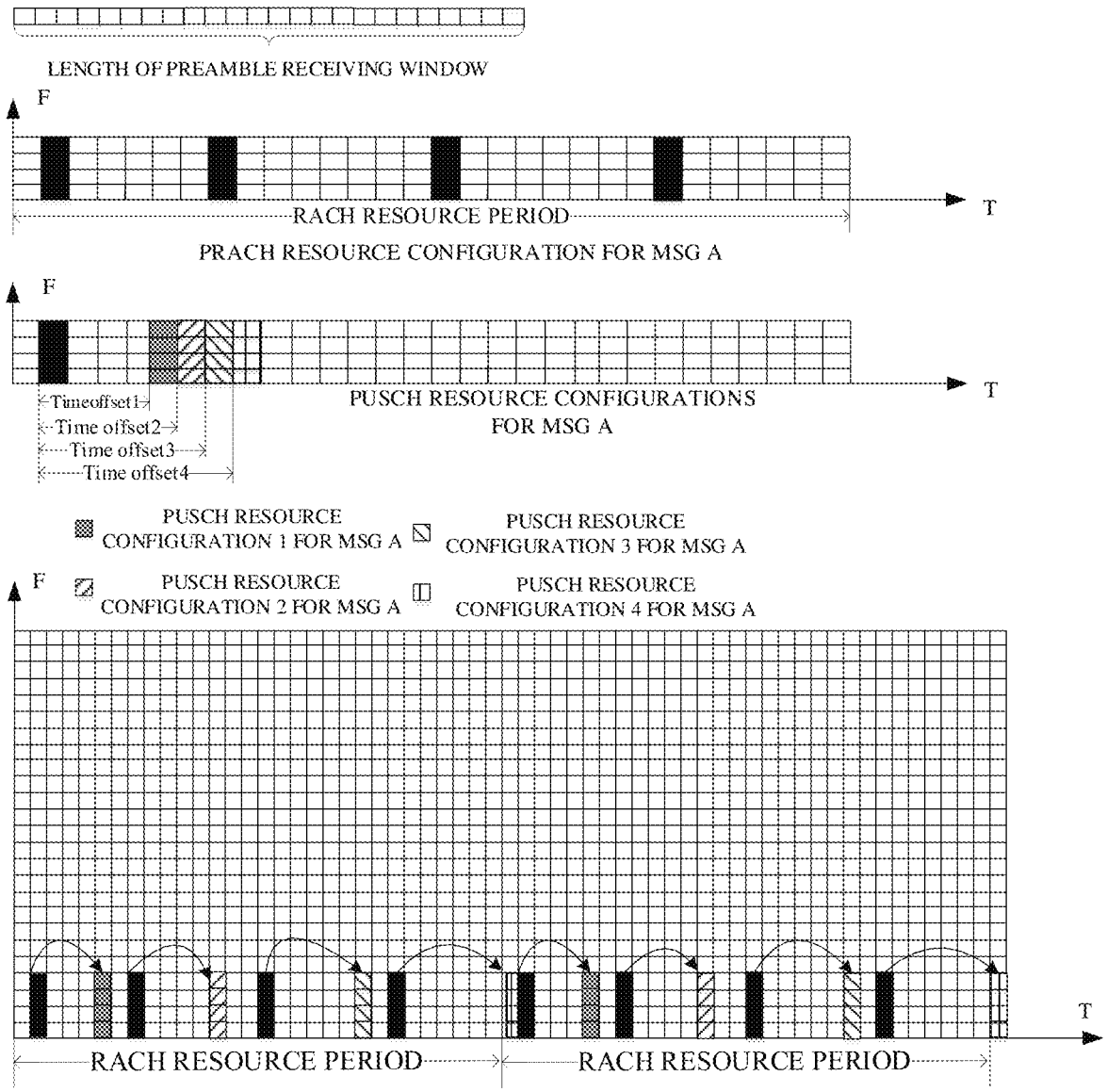
FIG. 2C is a schematic diagram illustrating another correspondence between a PRACH time-domain resource configuration and PUSCH resource configurations provided in implementations of the disclosure.

For example, as illustrated in FIG. 2C, supposing that the PRACH resource configuration of the MSG A corresponds to 4 ROs in an RACH resource period, specifically a first time-domain RO, a second time-domain RO, a third time-domain RO, and a fourth time-domain RO. The PUSCH resource configurations of the MSG A include 4 PUSCH resource configurations, specifically PUSCH resource configuration 1 of the MSG A, PUSCH resource configuration 2 of the MSG A, PUSCH resource configuration 3 of the MSG A, and PUSCH resource configuration 4 of the MSG A. The PUSCH resource configuration 1 corresponds to RO1 time-domain resource location, and a time offset of the PUSCH resource configuration 1 relative to the RO1 time-domain resource location is time offset 1. The PUSCH resource configuration 2 corresponds to RO2 time-domain resource location, and a time offset of the PUSCH resource configuration 2 relative to the RO2 time-domain resource location is time offset 2. The PUSCH resource configuration 3 corresponds to RO3 time-domain resource location, and a time offset of the PUSCH resource configuration 3 relative to the RO3 time-domain resource location is time offset 3. The PUSCH resource configuration 4 corresponds to RO4 time-domain resource location, and a time offset of the PUSCH resource configuration 4 relative to the RO4 time-domain resource location is time offset 4. The time offset 1, the time offset 2, the time offset 3, and the time offset 4 are different from each other. The PUSCH resource configuration 1 of the MSG A is mapped to the first time-domain RO in a PRACH resource period. The PUSCH resource configuration 2 of the MSG A is mapped to the second time-domain RO in the PRACH resource period. The PUSCH resource configuration 3 of the MSG A is mapped to the third time-domain RO in the PRACH resource period. The PUSCH resource configuration 4 of the MSG A is mapped to the fourth time-domain RO in the PRACH resource period.

As can be seen in the example, since PO time-domain resource locations corresponding to different ROs within the preamble receiving window are different mutually and the N PUSCH resource are non-overlapping mutually in the time domain, a PO associated with a single preamble received within an overlap of preamble receiving windows only corresponds to a single determined RO, which can avoid that the PO associated with the preamble received within the overlap of the preamble receiving windows corresponds to multiple ROs. The network device can determine, according to the PUSCH for the MSG A received, the PRACH resource for transmitting the preamble of the MSG A by the terminal device, thereby effectively solving preamble receiving window blur at a network side.

In a possible implementation, the N PUSCH resource configurations correspond to a same time-frequency resource configuration. The N PUSCH resource configurations correspond to different demodulation reference signal (DMRS) sequences. Any two of N DMRS sequences corresponding to the N PUSCH resource configurations have no intersection.

In possible implementations, the correspondence is for constraining DMRS sequences of POs corresponding to different ROs to be different from each other during any period of time having a length equal to the length of the preamble receiving window.

As can be seen in the example, since the N PUSCH resource configurations correspond to different DMRS sequences, and any two of the DMRS sequences have no intersection, that is, POs associated with different ROs correspond to different DMRS sequences with no intersection, a PO associated with a single preamble received within an overlap of preamble receiving windows only corresponds to a single determined RO, which can avoid that the PO associated with the preamble received within the overlap of the preamble receiving windows corresponds to multiple ROs. The network device can determine, according to the PUSCH for the MSG A received, the PRACH resource for transmitting the preamble of the MSG A by the terminal device, thereby effectively solving preamble receiving window blur at a network side.

In a possible implementation, the method further includes the following in response to reception of the first configuration information from the network device by the terminal device. The terminal device transmits the MSG A according to the first configuration information during the RA. The terminal device receives an RAR from the network device, where the RAR includes an initial TA of the terminal device.

Correspondingly, the method further includes the following in response to transmission of the first configuration information by the network device to the terminal device. The network device receives the MSG A from the terminal device, where the MSG A is transmitted by the terminal device according to the first configuration information during the RA. The network device transmits the RAR to the terminal device, where the RAR includes the initial TA of the terminal device.

In specific implementations, when the terminal device transmits the MSG A during the RA, the terminal device determines a PRACH resource to be used and a PUSCH resource to be used according to the PRACH resource configuration and the PUSCH resource configurations indicated by the network device as follows. The terminal device determines the PRACH resource first, and determines a PUSCH resource configuration corresponding to an RO time-domain resource according to the correspondence between the PRACH time-domain resource and the PUSCH resource configurations. The terminal device then self-selects a PUSCH resource from the PUSCH resource configuration (in a case of contention-based RA) or determines a PUSCH resource in the PUSCH resource configuration according to an indication of the network device (in a case of non-contention-based RA).

The network device determines the PRACH time-domain resource that is used by the terminal device to transmit the preamble of the MSG A in response to reception of the MSG A from the terminal device, such that an RA-RNTI for the terminal device can be determined. The network device determines the initial TA of the terminal device according to a point of time at which the terminal device transmits the preamble and a point of time at which the network receives the preamble, and informs the terminal device of the initial TA with the RAR.

As can be seen in the example, the terminal device can interact with the network device, and the initial TA of the terminal device can be determined based on the correspondence above. Since POs corresponding to different RO time-domain resource locations are distributed on different PUSCH resource configurations, a PO associated with a single preamble received within an overlap of preamble receiving windows only corresponds to a single determined RO. The network device can determine, according to the PUSCH for the MSG A received, the PRACH resource for transmitting the preamble of the MSG A by the terminal device, thereby effectively solving preamble receiving window blur at a network side and improving a success rate of initial-TA determination.

In possible implementations, the initial TA is obtained by performing the following operations by the network device. The PRACH time-domain resource that is used by the terminal device to transmit the preamble of the MSG A is determined according to a frequency-domain resource location of the PUSCH for receiving the MSG A and the correspondence. The RA-RNTI for the terminal device is determined according to the PRACH time-domain resource used. The TA of the terminal device is determined according to the point of time (the point of time can be obtained according to a PRACH time-domain location) at which the terminal device transmits the preamble and the point of time at which the network device receives the preamble.

As can be seen in the example, the terminal device can interact with the network device as follows. The PRACH time-domain resource that is used by the terminal device to transmit the preamble of the MSG A is determined according to the frequency-domain resource location of the PUSCH for receiving the MSG A and the correspondence. The RA-RNTI for the terminal device is determined according to the PRACH time-domain resource used. The TA of the terminal device is determined according to the point of time at which the terminal device transmits the preamble and the point of time at which the network device receives the preamble. Since POs corresponding to different RO time-domain resource locations are distributed on different PUSCH resource configurations, a PO associated with a single preamble received within an overlap of preamble receiving windows only corresponds to a single determined RO. The network device can determine, according to the PUSCH for the MSG A received, the PRACH resource for transmitting the preamble of the MSG A by the terminal device, thereby effectively solving preamble receiving window blur at a network side and improving a success rate of initial-TA determination.

In the possible implementation, the initial TA is obtained by performing the following operations by the network device. The PRACH time-domain resource that is used by the terminal device to transmit the preamble of the MSG A is determined according to a time offset of the PUSCH for receiving the MSG A relative to the PRACH for receiving the MSG A (a corresponding PRACH time-domain resource can be determined according to a time offset since different configurations correspond to different time offsets). The RA-RNTI for the terminal device is determined according to the PRACH time-domain resource used. The TA of the terminal device is determined according to the point of time at which the terminal device transmits the preamble and the point of time at which the network device receives the preamble.

As can be seen in the example, the terminal device can interact with the network device as follows. The PRACH time-domain resource that is used by the terminal device to transmit the preamble of the MSG A is determined according to the time offset of the PUSCH for receiving the MSG A relative to the PRACH for receiving the MSG A. The RA-RNTI for the terminal device is determined according to the PRACH time-domain resource used. The TA of the terminal device is determined according to the point of time at which the terminal device transmits the preamble and the point of time at which the network device receives the preamble. Since POs corresponding to different RO time-domain resource locations are distributed on different PUSCH resource configurations, a PO associated with a single preamble received within an overlap of preamble receiving windows only corresponds to a single determined RO. The network device can determine, according to the PUSCH for the MSG A received, the PRACH resource for transmitting the preamble of the MSG A by the terminal device, thereby effectively solving preamble receiving window blur at a network side and improving a success rate of initial-TA determination.

In possible implementations, the initial TA is obtained by performing the following operations by the network device. The PRACH time-domain resource that is used by the terminal device to transmit the preamble of the MSG A is determined according to a DMARS sequence corresponding to the PUSCH for receiving the MSG A and the correspondence. The RA-RNTI for the terminal device is determined according to the PRACH time-domain resource used. The TA of the terminal device is determined according to the point of time at which the terminal device transmits the preamble and the point of time at which the network device receives the preamble.

As can be seen in the example, the terminal device can interact with the network device as follows. The PRACH time-domain resource that is used by the terminal device to transmit the preamble of the MSG A is determined according to the DMARS sequence corresponding to the PUSCH for receiving the MSG A and the correspondence. The RA-RNTI for the terminal device is determined according to the PRACH time-domain resource used. The TA of the terminal device is determined according to the point of time at which the terminal device transmits the preamble and the point of time at which the network device receives the preamble. Since POs corresponding to different RO time-domain resource locations are distributed on different PUSCH resource configurations, a PO associated with a single preamble received within an overlap of preamble receiving windows only corresponds to a single determined RO. The network device can determine, according to the PUSCH of the MSG A received, the PRACH resource for transmitting the preamble of the MSG A by the terminal device, thereby effectively solving preamble receiving window blur at a network side and improving a success rate of initial-TA determination.

Figure 3:
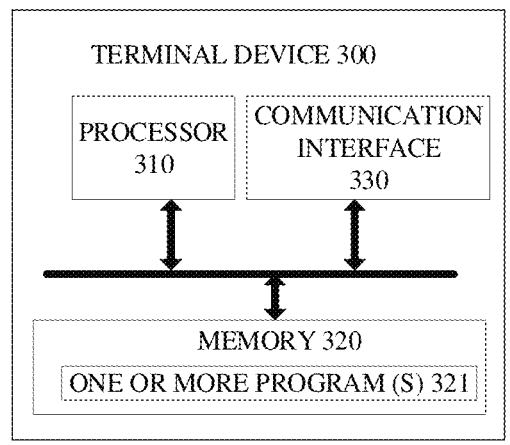
FIG. 3 is a schematic structural diagram illustrating a terminal device provided in implementations of the disclosure.

In consistence with the implementations in FIG. 2, referring to FIG. 3, FIG. 3 is a schematic structural diagram illustrating a terminal device 300 provided in implementations of the disclosure. As illustrated in FIG. 3, the terminal device 300 includes a processor 310, a memory 320, a communication interface 330, and one or more program (s) 321, where the one or more program (s) 321 is stored in the memory 320 and is configured to be performed by the processor 310, and the one or more program (s) 321 includes instructions used for performing the following operations.

First configuration information is received from a network device. The first configuration information includes a PRACH resource configuration of a 2-step RA MSG A resource, PUSCH resource configurations of the 2-step RA MSG A resource, and a correspondence between a PRACH time-domain resource configuration and the PUSCH resource configurations. The PRACH resource configuration includes the PRACH time-domain resource configuration, and the PRACH time-domain resource configuration is for determining RO time-domain resource locations. The correspondence is for constraining POs corresponding to different RO time-domain resource locations to be distributed on different PUSCH resource configurations during any period of time having a length equal to a length of a preamble receiving window.

It can be seen that, in implementations of the disclosure, the first configuration information is synchronized between the network device and the terminal device. The first configuration information includes the PRACH resource configuration of the 2-step RA MSG A resource, the PUSCH resource configurations of the 2-step RA MSG A resource, and the correspondence between the PRACH time-domain resource configuration and the PUSCH resource configurations. The PRACH resource configuration includes the PRACH time-domain resource configuration, and the PRACH time-domain resource configuration is for determining the RO time-domain resource locations. Since the correspondence can be used to constrain POs corresponding to different RO time-domain resource locations to be distributed on different PUSCH resource configurations during any period of time having a length equal to the length of preamble receiving window, a PO corresponding to a preamble received within an overlap of preamble receiving windows is only associated with a single determined RO time-domain resource location, which can avoid that the PO associated with the preamble received within the overlap of the preamble receiving windows corresponds to multiple ROs, thereby effectively solving preamble receiving window blur at a network side.

In a possible implementation, the first configuration information is a cell public configuration, and the first configuration information is carried by a system message.

In a possible implementation, the PRACH resource configuration further includes a PRACH frequency-domain resource configuration indicating a consecutive PRACH frequency-domain resource.

In a possible implementation, the PUSCH resource configurations include N PUSCH resource configurations, and N is an integer greater than 1. The N PUSCH resource configurations include at least one of: the N PUSCH resource configurations corresponding to a same MCS and a same TBS or a value of N depending on the length of the preamble receiving window and an RACH-resource distribution density in a time domain.

In a possible implementation, each RO time-domain resource location determined by the PRACH time-domain resource configuration corresponds to one of the N PUSCH resource configurations in the correspondence.

In a possible implementation, the N PUSCH resource configurations correspond to a same time-domain resource configuration. The N PUSCH resource configurations have frequency-domain start locations different from each other and correspond to a same or different number of PUSCH frequency-domain resources for frequency division multiplexing. Any two PUSCH resources corresponding to a same time-domain location in the N PUSCH resource configurations are non-overlapping mutually in a frequency domain.

In a possible implementation, the correspondence is for constraining PO frequency-domain resource locations corresponding to different ROs to be different from each other during any period of time having a length equal to the length of the preamble receiving window.

In a possible implementation, the N PUSCH resource configurations correspond to a same frequency-domain resource configuration. The N PUSCH resource configurations correspond to different time-domain resource configurations. The N PUSCH resource configurations are non-overlapping mutually in the time domain, where non-overlapping mutually in the time domain means that time offsets of POs relative to ROs are different.

In a possible implementation, the N PUSCH resource configurations correspond to different time-domain resource configurations as follows. The N PUSCH resource configurations correspond to different time offsets, where each of the time offsets is a time offset of a PO slot relative to an RO slot. Alternatively, the N PUSCH resource configurations correspond to different in-slot start time offsets, where each of the in-slot start time offsets is a start-symbol sequence number of a first PO within each PO slot.

In a possible implementation, the correspondence is for constraining PO time-domain resource locations corresponding to different ROs to be different from each other during any period of time having a length equal to the length of the preamble receiving window.

In a possible implementation, the N PUSCH resource configurations correspond to a same time-frequency resource configuration. The N PUSCH resource configurations correspond to different DMRS sequences. Any two of N DMRS sequences corresponding to the N PUSCH resource configurations have no intersection.

In a possible implementation, the correspondence is for constraining DMRS sequences of POs corresponding to different ROs to be different from each other during any period of time having a length equal to the length of the preamble receiving window.

In a possible implementation, the program further includes instructions used for performing the following operations. In response to reception of the first configuration information from the network device, MSG A is transmitted according to the first configuration information during RA, and an RAR is received from the network device, where the RAR includes an initial TA of the terminal device.

In a possible implementation, the initial TA is obtained by performing the following operations by the network device. A PRACH time-domain resource that is used by the terminal device to transmit the preamble of the MSG A is determined according to a frequency-domain resource location of a PUSCH for receiving the MSG A and the correspondence. An RA-RNTI for the terminal device is determined according to the PRACH time-domain resource used. The TA of the terminal device is determined according to a point of time at which the terminal device transmits the preamble and a point of time at which the network device receives the preamble.

In a possible implementation, the initial TA is obtained by performing the following operations by the network device. The PRACH time-domain resource that is used by the terminal device to transmit the preamble of the MSG A is determined according to a time offset of the PUSCH for receiving the MSG A relative to the PRACH for receiving the MSG A. The RA-RNTI for the terminal device is determined according to the PRACH time-domain resource used. The TA of the terminal device is determined according to the point of time at which the terminal device transmits the preamble and the point of time at which the network device receives the preamble.

In a possible implementation, the initial TA is obtained by performing the following operations by the network device. The PRACH time-domain resource that is used by the terminal device to transmit the preamble of the MSG A is determined according to a DMARS sequence corresponding to the PUSCH for receiving the MSG A and the correspondence. The RA-RNTI for the terminal device is determined according to the PRACH time-domain resource used. The TA of the terminal device is determined according to the point of time at which the terminal device transmits the preamble and the point of time at which the network device receives the preamble.

Figure 4:
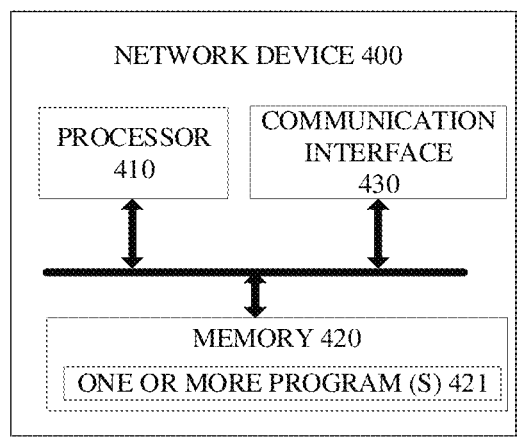
FIG. 4 is a schematic structural diagram illustrating a network device provided in implementations of the disclosure.

Referring to FIG. 4, FIG. 4 is a schematic structural diagram illustrating a network device 400 provided in implementations of the disclosure. As illustrated in FIG. 4, the network device 400 includes a processor 410, a memory 420, a communication interface 430, and one or more program (s) 421, where the one or more program (s) 421 is stored in the memory 420 and is configured to be performed by the processor 410, and the one or more program (s) 421 includes instructions used for performing the following operations.

First configuration information is transmitted to a terminal device. The first configuration information includes a PRACH resource configuration of a 2-step RA MSG A resource, PUSCH resource configurations of the 2-step RA MSG A resource, and a correspondence between a PRACH time-domain resource configuration and the PUSCH resource configurations. The PRACH resource configuration includes the PRACH time-domain resource configuration, and the PRACH time-domain resource configuration is for determining RO time-domain resource locations. The correspondence is for constraining POs corresponding to different RO time-domain resource locations to be distributed on different PUSCH resource configurations during any period of time having a length equal to a length of a preamble receiving window.

It can be seen that, in implementations of the disclosure, the first configuration information is synchronized between the network device and the terminal device. The first configuration information includes the PRACH resource configuration of the 2-step RA MSG A resource, the PUSCH resource configurations of the 2-step RA MSG A resource, and the correspondence between the PRACH time-domain resource configuration and the PUSCH resource configurations. The PRACH resource configuration includes the PRACH time-domain resource configuration, and the PRACH time-domain resource configuration is for determining the RO time-domain resource locations. Since the correspondence can be used to constrain POs corresponding to different RO time-domain resource locations to be distributed on different PUSCH resource configurations during any period of time having a length equal to the length of the preamble receiving window, a PO corresponding to a preamble received within an overlap of preamble receiving windows is only associated with a single determined RO time-domain resource location, which can avoid that the PO associated with the preamble received within the overlap of the preamble receiving windows corresponds to multiple ROs, thereby effectively solving preamble receiving window blur at a network side.

In a possible implementation, the first configuration information is a cell public configuration, and the first configuration information is carried by a system message.

In a possible implementation, the PRACH resource configuration further includes a PRACH frequency-domain resource configuration indicating a consecutive PRACH frequency-domain resource.

In a possible implementation, the PUSCH resource configurations include N PUSCH resource configurations, and N is an integer greater than 1. The N PUSCH resource configurations include at least one of: the N PUSCH resource configurations corresponding to a same MCS and a same TBS or a value of N depending on the length of the preamble receiving window and an RACH-resource distribution density in a time domain.

In a possible implementation, each RO time-domain resource location determined by the PRACH time-domain resource configuration corresponds to one of the N PUSCH resource configurations in the correspondence.

In a possible implementation, the N PUSCH resource configurations correspond to a same time-domain resource configuration. The N PUSCH resource configurations have frequency-domain start locations different from each other and correspond to a same or different number of PUSCH frequency-domain resources for frequency division multiplexing. Any two PUSCH resources corresponding to a same time-domain location in the N PUSCH resource configurations are non-overlapping mutually in a frequency domain.

In a possible implementation, the correspondence is for constraining PO frequency-domain resource locations corresponding to different ROs to be different from each other during any period of time having a length equal to the length of the preamble receiving window.

In a possible implementation, the N PUSCH resource configurations correspond to a same frequency-domain resource configuration. The N PUSCH resource configurations correspond to different time-domain resource configurations. The N PUSCH resource configurations are non-overlapping mutually in the time domain, where non-overlapping mutually in the time domain means that time offsets of POs relative to ROs are different.

In a possible implementation, the N PUSCH resource configurations correspond to different time-domain resource configurations as follows. The N PUSCH resource configurations correspond to different time offsets, where each of the time offsets is a time offset of a PO slot relative to an RO slot. Alternatively, the N PUSCH resource configurations correspond to different in-slot start time offsets, where each of the in-slot start time offsets is a start-symbol sequence number of a first PO within each PO slot.

In a possible implementation, the correspondence is for constraining PO time-domain resource locations corresponding to different ROs to be different from each other during any period of time having a length equal to the length of the preamble receiving window.

In a possible implementation, the N PUSCH resource configurations correspond to a same time-frequency resource configuration. The N PUSCH resource configurations correspond to different DMRS sequences. Any two of N DMRS sequences corresponding to the N PUSCH resource configurations have no intersection.

In a possible implementation, the correspondence is for constraining DMRS sequences of POs corresponding to different ROs to be different from each other during any period of time having a length equal to the length of the preamble receiving window.

In a possible implementation, the program further includes instructions used for performing the following operations. In response to transmission of the first configuration information to the terminal device, MSG A is received from the terminal device, where the MSG A is transmitted by the terminal device according to the first configuration information during RA, and an RAR is transmitted to the terminal device, where the RAR includes an initial TA of the terminal device.

In a possible implementation, the initial TA is obtained by performing the following operations by the network device. A PRACH time-domain resource that is used by the terminal device to transmit the preamble of the MSG A is determined according to a frequency-domain resource location of a PUSCH for receiving the MSG A and the correspondence. An RA-RNTI for the terminal device is determined according to the PRACH time-domain resource used. The TA of the terminal device is determined according to a point of time at which the terminal device transmits the preamble and a point of time at which the network device receives the preamble.

In a possible implementation, the initial TA is obtained by performing the following operations by the network device. The PRACH time-domain resource that is used by the terminal device to transmit the preamble of the MSG A is determined according to a time offset of the PUSCH for receiving the MSG A relative to the PRACH for receiving the MSG A. The RA-RNTI for the terminal device is determined according to the PRACH time-domain resource used. The TA of the terminal device is determined according to the point of time at which the terminal device transmits the preamble and the point of time at which the network device receives the preamble.

In a possible implementation, the initial TA is obtained by performing the following operations by the network device. The PRACH time-domain resource that is used by the terminal device to transmit the preamble of the MSG A is determined according to a DMARS sequence corresponding to the PUSCH for receiving the MSG A and the correspondence. The RA-RNTI for the terminal device is determined according to the PRACH time-domain resource used. The TA of the terminal device is determined according to the point of time at which the terminal device transmits the preamble and the point of time at which the network device receives the preamble.

The foregoing solution of the implementations of the disclosure is mainly illustrated from the viewpoint of interaction process of various network elements. It can be understood that, in order to implement the above functions, the terminal device includes hardware structures and/or software modules for performing the respective functions. Those skilled in the art should readily recognize that, in combination with the units and algorithmic operations of various examples illustrated in the implementations disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the illustrated functions for each particular application, but such implementation should not be considered as beyond the scope of the present disclosure.

According to the implementations of the disclosure, functional units may be divided for the terminal device in accordance with the foregoing method examples. For example, each functional unit may be divided according to each function, and two or more functions may be integrated in one processing unit. The above-mentioned integrated unit can be implemented in the form of hardware or software program modules. It should be noted that the division of units in the implementations of the present disclosure is schematic, and is merely a logical function division, and there may be other division manners in actual implementation.

Figure 5:
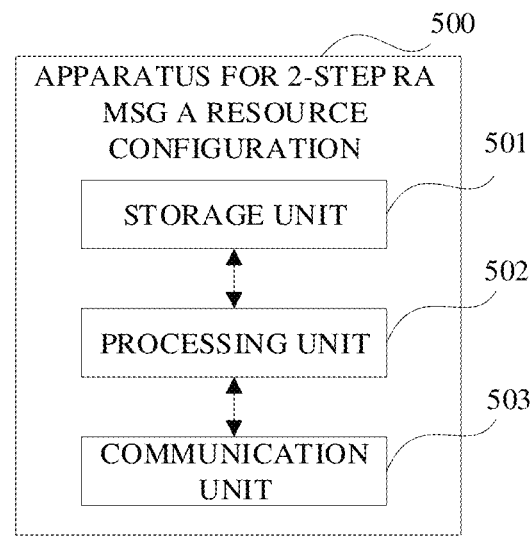
FIG. 5 is a block diagram illustrating function units of an apparatus for 2-step RA MSG A resource configuration provided in implementations of the disclosure.

In the case of the integrated unit, FIG. 5 is a block diagram illustrating functional units of the apparatus for 2-step RA MSG A resource configuration involved in the foregoing implementations. The apparatus 500 for 2-step RA MSG A resource configuration is applied to a terminal device and includes a processing unit 502 and a communication unit 503. The processing unit 502 is configured to control and manage actions of the terminal device, for example, the processing unit 502 is configured to support the terminal device to perform the operations at 201 and the operations at 202 in FIG. 2A and/or other processes of the technology illustrated in the disclosure. The communication unit 503 is configured to support communication between the terminal device and other devices. The terminal device further includes a storage unit 501 configured to store program codes and data of the terminal device.

The processing unit 502 can be a processor or a controller, for example, a central processing unit (CPU), a general-purpose processor, a digital signal processor (DSP), an application specific integrated circuit (ASIC), a field programmable gate array (FPGA), other programmable logic devices, transistor logic devices, hardware components, or any combination thereof. Various exemplary logical blocks, modules, and circuits illustrated in conjunction with the disclosure may be achieved or implemented. The processor also may be a combination realizing computing functions, for example, a combination of one or more microprocessors, a combination of the DSP and the microprocessor, or the like. The communication unit 503 may be a communication interface, a transceiver, a transceiver circuit, or the like. The storage unit 501 may be a memory. When the processing unit 502 is the processor, the communication unit 503 is the communication interface, and the storage unit 501 is the memory, the terminal device involved in implementations of the disclosure may be the terminal device illustrated in FIG. 3.

In specific implementations, the processing unit 502 is configured to perform any of operations performed by the terminal device in the foregoing method implementations, and when performing data transmission such as transmitting, it is possible to invoke the communication unit 503 to complete corresponding operations, which will be illustrated below in detail.

The processing unit 502 is configured to receive first configuration information from a network device through using the communication unit. The first configuration information includes a PRACH resource configuration of a 2-step RA MSG A resource, PUSCH resource configurations of the 2-step RA MSG A resource, and a correspondence between a PRACH time-domain resource configuration and the PUSCH resource configurations. The PRACH resource configuration includes the PRACH time-domain resource configuration, and the PRACH time-domain resource configuration is for determining RO time-domain resource locations. The correspondence is for constraining POs corresponding to different RO time-domain resource locations to be distributed on different PUSCH resource configurations during any period of time having a length equal to a length of a preamble receiving window.

In a possible implementation, the first configuration information is a cell public configuration, and the first configuration information is carried by a system message.

In a possible implementation, the PRACH resource configuration further includes a PRACH frequency-domain resource configuration indicating a consecutive PRACH frequency-domain resource.

In a possible implementation, the PUSCH resource configurations include N PUSCH resource configurations, and N is an integer greater than 1. The N PUSCH resource configurations include at least one of: the N PUSCH resource configurations corresponding to a same MCS and a same TBS or a value of N depending on the length of the preamble receiving window and an RACH-resource distribution density in a time domain.

In a possible implementation, each RO time-domain resource location determined by the PRACH time-domain resource configuration corresponds to one of the N PUSCH resource configurations in the correspondence.

In a possible implementation, the N PUSCH resource configurations correspond to a same time-domain resource configuration. The N PUSCH resource configurations have frequency-domain start locations different from each other and correspond to a same or different number of PUSCH frequency-domain resources for frequency division multiplexing. Any two PUSCH resources corresponding to a same time-domain location in the N PUSCH resource configurations are non-overlapping mutually in a frequency domain.

In a possible implementation, the correspondence is for constraining PO frequency-domain resource locations corresponding to different ROs to be different from each other during any period of time having a length equal to the length of the preamble receiving window.

In a possible implementation, the N PUSCH resource configurations correspond to a same frequency-domain resource configuration. The N PUSCH resource configurations correspond to different time-domain resource configurations. The N PUSCH resource configurations are non-overlapping mutually in the time domain, where non-overlapping mutually in the time domain means that time offsets of POs relative to ROs are different.

In a possible implementation, the N PUSCH resource configurations correspond to different time-domain resource configurations as follows. The N PUSCH resource configurations correspond to different time offsets, where each of the time offsets is a time offset of a PO slot relative to an RO slot. Alternatively, the N PUSCH resource configurations correspond to different in-slot start time offsets, where each of the in-slot start time offsets is a start-symbol sequence number of a first PO within each PO slot.

In a possible implementation, the correspondence is for constraining PO time-domain resource locations corresponding to different ROs to be different from each other during any period of time having a length equal to the length of the preamble receiving window.

In a possible implementation, the N PUSCH resource configurations correspond to a same time-frequency resource configuration. The N PUSCH resource configurations correspond to different DMRS sequences. Any two of N DMRS sequences corresponding to the N PUSCH resource configurations have no intersection.

In a possible implementation, the correspondence is for constraining DMRS sequences of POs corresponding to different ROs to be different from each other during any period of time having a length equal to the length of the preamble receiving window.

In a possible implementation, in response to reception of the first configuration information from the network device by the processing unit through using the communication unit, the processing unit is further configured to transmit, through using the communication unit, MSG A according to the first configuration information during RA, and receive an RAR from the network device through using the communication unit, where the RAR includes an initial TA of the terminal device.

In a possible implementation, the initial TA is obtained by performing the following operations by the network device. A PRACH time-domain resource that is used by the terminal device to transmit a preamble of the MSG A is determined according to a frequency-domain resource location of a PUSCH for receiving the MSG A and the correspondence.

An RA-RNTI for the terminal device is determined according to the PRACH time-domain resource used. The TA of the terminal device is determined according to a point of time at which the terminal device transmits the preamble and a point of time at which the network device receives the preamble.

In a possible implementation, the initial TA is obtained by performing the following operations by the network device. The PRACH time-domain resource that is used by the terminal device to transmit the preamble of the MSG A is determined according to a time offset of the PUSCH for receiving the MSG A relative to the PRACH for receiving the MSG A. The RA-RNTI for the terminal device is determined according to the PRACH time-domain resource used. The TA of the terminal device is determined according to the point of time at which the terminal device transmits the preamble and the point of time at which the network device receives the preamble.

In a possible implementation, the initial TA is obtained by performing the following operations by the network device. The PRACH time-domain resource that is used by the terminal device to transmit the preamble of the MSG A is determined according to a DMARS sequence corresponding to the PUSCH for receiving the MSG A and the correspondence. The RA-RNTI for the terminal device is determined according to the PRACH time-domain resource used. The TA of the terminal device is determined according to the point of time at which the terminal device transmits the preamble and the point of time at which the network device receives the preamble.

Figure 6:
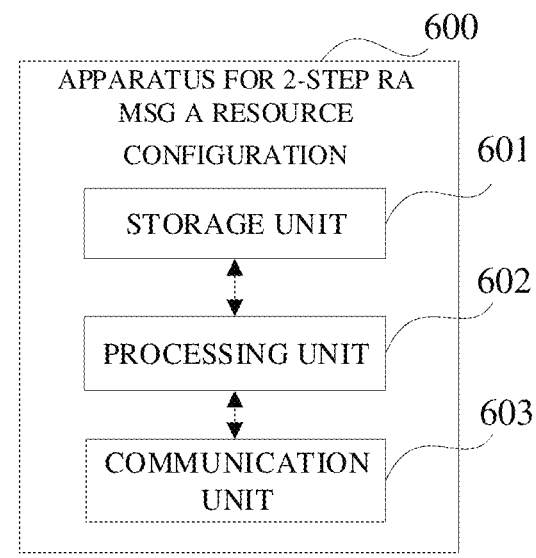
FIG. 6 is a block diagram illustrating function units of an apparatus for 2-step RA MSG A resource configuration provided in implementations of the disclosure.

In the case of the integrated unit, FIG. 6 is a block diagram illustrating functional units of the apparatus for 2-step RA MSG A resource configuration related in the foregoing implementations. The apparatus 600 for 2-step RA MSG A resource configuration is applied to a network device and includes a processing unit 602 and a communication unit 603. The processing unit 602 is configured to control and manage actions of the network device, for example, the processing unit 602 is configured to support the network device to perform the operations at 202 and the operations at 204 in FIG. 2A and/or other processes of the technology illustrated in the disclosure. The communication unit 603 is configured to support communication between the network device and other devices. The network device further includes a storage unit 601 configured to store program codes and data of a terminal device.

The processing unit 602 can be a processor or a controller, for example, a CPU, a general-purpose processor, a DSP, an ASIC, a FPGA, other programmable logic devices, transistor logic devices, hardware components, or any combination thereof. Various exemplary logical blocks, modules, and circuits illustrated in conjunction with the disclosure may be achieved or implemented. The processor also may be a combination of computing functions, for example, a combination of one or more microprocessors, a combination of the DSP and the microprocessor, or the like. The communication unit 603 may be a communication interface, a transceiver, a transceiver circuit, or the like. The storage unit 601 may be a memory. If the processing unit 602 is a processor, the communication unit 603 is a communication interface, and the storage unit 601 is a memory, the terminal device involved in implementations of the disclosure may be the network device illustrated in FIG. 4.

The processing unit 602 is configured to transmit first configuration information to the terminal device through using the communication unit 603. The first configuration information includes a PRACH resource configuration of a 2-step RA MSG A resource, PUSCH resource configurations of the 2-step RA MSG A resource, and a correspondence between a PRACH time-domain resource configuration and the PUSCH resource configurations. The PRACH resource configuration includes the PRACH time-domain resource configuration, and the PRACH time-domain resource configuration is for determining RO time-domain resource locations. The correspondence is for constraining POs corresponding to different RO time-domain resource locations to be distributed on different PUSCH resource configurations during any period of time having a length equal to a length of a preamble receiving window.

In a possible implementation, the first configuration information is a cell public configuration, and the first configuration information is carried by a system message.

In a possible implementation, the PRACH resource configuration further includes a PRACH frequency-domain resource configuration indicating a consecutive PRACH frequency-domain resource.

In a possible implementation, the PUSCH resource configurations include N PUSCH resource configurations, and N is an integer greater than 1. The N PUSCH resource configurations include at least one of: the N PUSCH resource configurations corresponding to a same MCS and a same TBS or a value of N depending on the length of the preamble receiving window and an RACH-resource distribution density in a time domain.

In a possible implementation, each RO time-domain resource location determined by the PRACH time-domain resource configuration corresponds to one of the N PUSCH resource configurations in the correspondence.

In a possible implementation, the N PUSCH resource configurations correspond to a same time-domain resource configuration. The N PUSCH resource configurations have frequency-domain start locations different from each other and correspond to a same or different number of PUSCH frequency-domain resources for frequency division multiplexing. Any two PUSCH resources corresponding to a same time-domain location in the N PUSCH resource configurations are non-overlapping mutually in a frequency domain.

In a possible implementation, the correspondence is for constraining PO frequency-domain resource locations corresponding to different ROs to be different from each other during any period of time having a length equal to the length of the preamble receiving window.

In a possible implementation, the N PUSCH resource configurations correspond to a same frequency-domain resource configuration. The N PUSCH resource configurations correspond to different time-domain resource configurations. The N PUSCH resource configurations are non-overlapping mutually in the time domain, where non-overlapping mutually in the time domain means that time offsets of POs relative to ROs are different.

In a possible implementation, the N PUSCH resource configurations correspond to different time-domain resource configurations as follows. The N PUSCH resource configurations correspond to different time offsets, where each of the time offsets is a time offset of a PO slot relative to an RO slot. Alternatively, the N PUSCH resource configurations correspond to different in-slot start time offsets, where each of the in-slot start time offsets is a start-symbol sequence number of a first PO within each PO slot.

In a possible implementation, the correspondence is for constraining PO time-domain resource locations corresponding to different ROs to be different from each other during any period of time having a length equal to the length of the preamble receiving window.

In a possible implementation, the N PUSCH resource configurations correspond to a same time-frequency resource configuration. The N PUSCH resource configurations correspond to different DMRS sequences. Any two of N DMRS sequences corresponding to the N PUSCH resource configurations have no intersection.

In a possible implementation, the correspondence is for constraining DMRS sequences of POs corresponding to different ROs to be different from each other during any period of time having a length equal to the length of the preamble receiving window.

In a possible implementation, in response to transmission of the first configuration information by the processing unit to the terminal device through using the communication unit, the processing unit is further configured to receive MSG A from the terminal device, where the MSG A is transmitted by the terminal device according to the first configuration information during RA, and transmit an RAR to the terminal device, where the RAR includes an initial TA of the terminal device.

In a possible implementation, the initial TA is obtained by performing the following operations by the network device. A PRACH time-domain resource that is used by the terminal device to transmit a preamble of the MSG A is determined according to a frequency-domain resource location of a PUSCH for receiving the MSG A and the correspondence. An RA-RNTI for the terminal device is determined according to the PRACH time-domain resource used. The TA of the terminal device is determined according to a point of time at which the terminal device transmits the preamble and a point of time at which the network device receives the preamble.

In a possible implementation, the initial TA is obtained by performing the following operations by the network device. The PRACH time-domain resource that is used by the terminal device to transmit the preamble of the MSG A is determined according to a time offset of the PUSCH for receiving the MSG A relative to the PRACH for receiving the MSG A. The RA-RNTI for the terminal device is determined according to the PRACH time-domain resource used. The TA of the terminal device is determined according to the point of time at which the terminal device transmits the preamble and the point of time at which the network device receives the preamble.

In a possible implementation, the initial TA is obtained by performing the following operations by the network device. The PRACH time-domain resource that is used by the terminal device to transmit the preamble of the MSG A is determined according to a DMARS sequence corresponding to the PUSCH for receiving the MSG A and the correspondence. The RA-RNTI for the terminal device is determined according to the PRACH time-domain resource used. The TA of the terminal device is determined according to the point of time at which the terminal device transmits the preamble and the point of time at which the network device receives the preamble.

It can be understood that, since the method implementations and the apparatus implementations are different representation forms of the same technical concept, the contents of the method implementations in the disclosure may be synchronously adapted to the apparatus implementations, which will not be repeated herein.

A chip is further provided in implementations of the disclosure. The chip includes a processor configured to invoke and execute a computer program stored in a memory, to enable a device equipped with the chip to execute some or all of the operations performed by the terminal device in the above-mentioned method implementations.

A computer-readable storage medium is further provided in implementations of the disclosure. The computer-readable storage medium is configured to store a computer program used for performing electronic data interchange, where the computer program enables a computer to execute some or all of the operations performed by the terminal device in the above-mentioned method implementations.

A computer-readable storage medium is further provided in implementations of the disclosure. The computer-readable storage medium is configured to store a computer program used for performing electronic data interchange, where the computer program enables a computer to execute some or all of the operations performed by the network device in the above-mentioned method implementations.

A computer program product is further provided in implementations of the disclosure. The computer program product includes a computer program which can be operated to enable a computer to execute some or all of the operations performed by the terminal device in the above-mentioned method implementations. The computer program product may be a software installation package.

The algorithmic operations and the method illustrated in implementations may be implemented as hardware, or may be implemented by a processor performing software instructions. The software instructions may be composed with corresponding software modules. The software module can be stored in a storage medium such as a random access memory (RAM), a flash memory, a read only memory (ROM), an erasable programmable read-only memory (EPROM), an electrically erasable programmable read-only memory (EEPROM), a register, a hard disc, a mobile hard disc, or a compact disc read-only memory (CD-ROM), or in storage media with any other forms known in this field. An exemplary storage medium is coupled to the processor, so that the processor can read information from the storage medium and can write information to the storage medium. Of course, the storage medium can also be a part of the processor. The processor and the storage medium may be located in an ASIC. In addition, the ASIC may be located in an access network device, a target network device, or a core network device. Of course, the processor and the storage medium may also be presented as discrete components in the access network device, the target network device, or the core network device.

Those skilled in the art can appreciate that, in the above-mentioned one or more implementations, all or part of the illustrated functions can be implemented through software, hardware, firmware, or any other combination thereof. When implemented by software, all or part of the above implementations can be implemented in the form of a computer program product. The computer program product includes one or more computer instructions. When the computer instructions are loaded and executed on a computer, all or part of the processes or functions of the implementations of the disclosure are performed. The computer can be a general-purpose computer, a special-purpose computer, a computer network, or other programmable apparatuses. The computer instructions can be stored in a computer-readable storage medium, or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer-accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

The above-mentioned implementations provide further details of the purpose, technical solutions and beneficial effects of the implementations of this disclosure. It can be understood that, the above is only specification implementation manners of the implementations of the disclosure and is not intended to limit the scope of protection of the implementations of the disclosure. Any modification, equivalent arrangements and improvement made on the basis of the technical solution of the implementations of the disclosure shall be included in the scope of protection of the implementations of the disclosure.

What is claimed is:

1. A method for 2-step random access (RA) message (MSG) A resource configuration, comprising:
receiving, by a terminal device, first configuration information from a network device, the first configuration information comprising a physical random access channel (PRACH) resource configuration of a 2-step RA MSG A resource, physical uplink shared channel (PUSCH) resource configurations of the 2-step RA MSG A resource, and a correspondence between a PRACH time-domain resource configuration and the PUSCH resource configurations, the PRACH resource configuration comprising the PRACH time-domain resource configuration, the PRACH time-domain resource configuration being for determining random access channel (RACH) occasion (RO) time-domain resource locations, wherein
the PRACH resource configuration further comprises a PRACH frequency-domain resource configuration indicating a consecutive PRACH frequency-domain resource;
the PUSCH resource configurations comprise N PUSCH resource configurations, and N is an integer greater than 1;
the N PUSCH resource configurations correspond to a same frequency-domain resource configuration;
the N PUSCH resource configurations correspond to different time-domain resource configurations, wherein the N PUSCH resource configurations corresponding to different time-domain resource configurations comprises: the N PUSCH resource configurations corresponding to different time offsets in an RACH resource period, wherein each of the time offsets is a time offset of a PUSCH occasion (PO) slot relative to a corresponding RO slot; and
the correspondence is for constraining PO time-domain resource locations corresponding to different ROs to be different from each other during any period of time having a length equal to a length of a preamble receiving window;
wherein the RACH resource configuration corresponds to a first time-domain RO, a second time-domain RO, a third time-domain RO, and a fourth time-domain RO in the RACH resource period, the first time-domain RO, the second time-domain RO, the third time-domain RO, and the fourth time-domain RO are different from each other in the RACH resource period, the N PUSCH configurations are a first PUSCH resource configuration, a second PUSCH resource, a third PUSCH resource configuration, and a fourth PUSCH resource configuration, and the N PUSCH resource configurations corresponding to different time offsets in the RACH resource period comprises:
the first PUSCH resource configuration corresponds to a first RO time-domain resource location, and a time offset of the first PUSCH resource configuration relative to the first RO time-domain resource location is a first time offset; the second PUSCH resource configuration corresponds to a second RO time-domain resource location, and a time offset of the second PUSCH resource configuration relative to the second RO time-domain resource location is a second time offset; the third PUSCH resource configuration corresponds to a third RO time-domain resource location, and a time offset of the third PUSCH resource configuration relative to the third RO time-domain resource location is a third time offset; and the fourth PUSCH resource configuration corresponds to a fourth RO time-domain resource location, and a time offset of the fourth PUSCH resource configuration relative to the fourth RO time-domain resource location is a fourth time offset; wherein the first time offset, the second time offset, the third time offset, and the fourth time offset are different from each other, and wherein the first PUSCH resource configuration is mapped to the first time-domain RO, the second PUSCH resource configuration is mapped to the second time-domain RO, the third PUSCH resource configuration is mapped to the third time-domain RO, and the fourth PUSCH resource configuration is mapped to the fourth time-domain RO.

2. The method of claim 1, wherein
the N PUSCH resource configurations comprise:
the N PUSCH resource configurations corresponding to a same modulation and coding scheme (MCS) and a same transport block size (TBS); and
each RO time-domain resource location determined by the PRACH time-domain resource configuration corresponds to one of the N PUSCH resource configurations in the correspondence.

3. The method of claim 1, wherein in response to reception of the first configuration information from the network device by the terminal device, the method further comprises:
transmitting, by the terminal device, MSG A according to the first configuration information during RA; and
receiving, by the terminal device, a random access response (RAR) from the network device, wherein the RAR comprises an initial timing advance (TA) of the terminal device.

4. The method of claim 3, wherein
the initial TA is obtained by performing the following operations by the network device:
determining a PRACH time-domain resource that is used by the terminal device to transmit a preamble of the MSG A, according to a frequency-domain resource location of a PUSCH for receiving the MSG A and the correspondence;
determining a random access radio network temporary identifier (RA-RNTI) for the terminal device according to the PRACH time-domain resource used; and
determining the TA of the terminal device according to a point of time at which the terminal device transmits the preamble and a point of time at which the network device receives the preamble; or the initial TA is obtained by performing the following operations by the network device:
determining a PRACH time-domain resource that is used by the terminal device to transmit a preamble of the MSG A, according to a time offset of a PUSCH for receiving the MSG A relative to a PRACH for receiving the MSG A;
determining an RA-RNTI for the terminal device according to the PRACH time-domain resource used; and
determining the TA of the terminal device according to a point of time at which the terminal device transmits the preamble and a point of time at which the network device receives the preamble; or
the initial TA is obtained by performing the following operations by the network device:
determining a PRACH time-domain resource that is used by the terminal device to transmit a preamble of the MSG A, according to a DMARS sequence corresponding to a PUSCH for receiving the MSG A and the correspondence;
determining an RA-RNTI for the terminal device according to the PRACH time-domain resource used; and
determining the TA of the terminal device according to a point of time at which the terminal device transmits the preamble and a point of time at which the network device receives the preamble.

5. The method of claim 1, wherein
the N PUSCH resource configurations comprise:
a value of N depending on the length of the preamble receiving window and an RACH-resource distribution density in a time domain; and
each RO time-domain resource location determined by the PRACH time-domain resource configuration corresponds to one of the N PUSCH resource configurations in the correspondence.

6. A method for 2-step random access (RA) message (MSG) A resource configuration, comprising:
transmitting, by a network device, first configuration information to a terminal device, the first configuration information comprising a physical random access channel (PRACH) resource configuration of a 2-step RA MSG A resource, physical uplink shared channel (PUSCH) resource configurations of the 2-step RA MSG A resource, and a correspondence between a PRACH time-domain resource configuration and the PUSCH resource configurations, the PRACH resource configuration comprising the PRACH time-domain resource configuration, the PRACH time-domain resource configuration being for determining random access channel (RACH) occasion (RO) time-domain resource locations, wherein
the PRACH resource configuration further comprises a PRACH frequency-domain resource configuration indicating a consecutive PRACH frequency-domain resource;
the PUSCH resource configurations comprise N PUSCH resource configurations, and N is an integer greater than 1;
the N PUSCH resource configurations correspond to a same frequency-domain resource configuration;
the N PUSCH resource configurations correspond to different time-domain resource configurations, wherein the N PUSCH resource configurations corresponding to different time-domain resource configurations comprises: the N PUSCH resource configurations corresponding to different time offsets in an RACH resource period, wherein each of the time offsets is a time offset of a PUSCH occasion (PO) slot relative to a corresponding RO slot; and
the correspondence is for constraining PO time-domain resource locations corresponding to different ROs to be different from each other during any period of time having a length equal to a length of a preamble receiving window;
wherein the RACH resource configuration corresponds to a first time-domain RO, a second time-domain RO, a third time-domain RO, and a fourth time-domain RO in the RACH resource period, the first time-domain RO, the second time-domain RO, the third time-domain RO, and the fourth time-domain RO are different from each other in the RACH resource period, the N PUSCH configurations are a first PUSCH resource configuration, a second PUSCH resource, a third PUSCH resource configuration, and a fourth PUSCH resource configuration, and the N PUSCH resource configurations corresponding to different time offsets in the RACH resource period comprises:
the first PUSCH resource configuration corresponds to a first RO time-domain resource location, and a time offset of the first PUSCH resource configuration relative to the first RO time-domain resource location is a first time offset; the second PUSCH resource configuration corresponds to a second RO time-domain resource location, and a time offset of the second PUSCH resource configuration relative to the second RO time-domain resource location is a second time offset; the third PUSCH resource configuration corresponds to a third RO time-domain resource location, and a time offset of the third PUSCH resource configuration relative to the third RO time-domain resource location is a third time offset; and the fourth PUSCH resource configuration corresponds to a fourth RO time-domain resource location, and a time offset of the fourth PUSCH resource configuration relative to the fourth RO time-domain resource location is a fourth time offset; wherein the first time offset, the second time offset, the third time offset, and the fourth time offset are different from each other, and wherein the first PUSCH resource configuration is mapped to the first time-domain RO, the second PUSCH resource configuration is mapped to the second time-domain RO, the third PUSCH resource configuration is mapped to the third time-domain RO, and the fourth PUSCH resource configuration is mapped to the fourth time-domain RO.

7. The method of claim 6, wherein
the N PUSCH resource configurations comprise:
the N PUSCH resource configurations corresponding to a same modulation and coding scheme (MCS) and a same transport block size (TBS); and
each RO time-domain resource location determined by the PRACH time-domain resource configuration corresponds to one of the N PUSCH resource configurations in the correspondence.

8. The method of claim 6, wherein in response to transmission of the first configuration information by the network device to the terminal device, the method further comprises:
receiving, by the network device, MSG A from the terminal device, wherein the MSG A is transmitted by the terminal device according to the first configuration information during RA; and transmitting, by the network device, a random access response (RAR) to the terminal device, wherein the RAR comprises an initial timing advance (TA) of the terminal device.

9. The method of claim 8, wherein
the initial TA is obtained by performing the following operations by the network device:
   determining a PRACH time-domain resource that is used by the terminal device to transmit a preamble of the MSG A, according to a frequency-domain resource location of a PUSCH for receiving the MSG A and the correspondence;
   determining a random access radio network temporary identifier (RA-RNTI) for the terminal device according to the PRACH time-domain resource used; and
   determining the TA of the terminal device according to a point of time at which the terminal device transmits the preamble and a point of time at which the network device receives the preamble; or
the initial TA is obtained by performing the following operations by the network device:
   determining a PRACH time-domain resource that is used by the terminal device to transmit a preamble of the MSG A, according to a time offset of a PUSCH for receiving the MSG A relative to a PRACH for receiving the MSG A;
   determining an RA-RNTI for the terminal device according to the PRACH time-domain resource used; and
   determining the TA of the terminal device according to a point of time at which the terminal device transmits the preamble and a point of time at which the network device receives the preamble; or
the initial TA is obtained by performing the following operations by the network device:
   determining a PRACH time-domain resource that is used by the terminal device to transmit a preamble of the MSG A, according to a DMARS sequence corresponding to a PUSCH for receiving the MSG A and the correspondence;
   determining an RA-RNTI for the terminal device according to the PRACH time-domain resource used; and
   determining the TA of the terminal device according to a point of time at which the terminal device transmits the preamble and a point of time at which the network device receives the preamble.

10. The method of claim 6, wherein
the N PUSCH resource configurations comprise:
a value of N depending on the length of the preamble receiving window and an RACH-resource distribution density in a time domain; and
each RO time-domain resource location determined by the PRACH time-domain resource configuration corresponds to one of the N PUSCH resource configurations in the correspondence.

11. A terminal device comprising:
a transceiver;
a processor; and
a memory storing a computer program;
the computer program being executed by the processor to cause the transceiver to:
receive first configuration information from a network device, wherein the first configuration information comprises a physical random access channel (PRACH) resource configuration of a 2-step RA MSG A resource, physical uplink shared channel (PUSCH) resource configurations of the 2-step RA MSG A resource, and a correspondence between a PRACH time-domain resource configuration and the PUSCH resource configurations, the PRACH resource configuration comprises the PRACH time-domain resource configuration, and the PRACH time-domain resource configuration is for determining random access channel (RACH) occasion (RO) time-domain resource locations, wherein
the PRACH resource configuration further comprises a PRACH frequency-domain resource configuration indicating a consecutive PRACH frequency-domain resource;
the PUSCH resource configurations comprise N PUSCH resource configurations, and N is an integer greater than 1;
the N PUSCH resource configurations correspond to a same frequency-domain resource configuration;
the N PUSCH resource configurations correspond to different time-domain resource configurations, wherein the N PUSCH resource configurations corresponding to different time-domain resource configurations comprises: the N PUSCH resource configurations corresponding to different time offsets in an RACH resource period, wherein each of the time offsets is a time offset of a PUSCH occasion (PO) slot relative to a corresponding RO slot; and
the correspondence is for constraining PO time-domain resource locations corresponding to different ROs to be different from each other during any period of time having a length equal to a length of a preamble receiving window;
wherein the RACH resource configuration corresponds to a first time-domain RO, a second time-domain RO, a third time-domain RO, and a fourth time-domain RO in the RACH resource period, the first time-domain RO, the second time-domain RO, the third time-domain RO, and the fourth time-domain RO are different from each other in the RACH resource period, the N PUSCH configurations are a first PUSCH resource configuration, a second PUSCH resource, a third PUSCH resource configuration, and a fourth PUSCH resource configuration, and the N PUSCH resource configurations corresponding to different time offsets in the RACH resource period comprises:
the first PUSCH resource configuration corresponds to a first RO time-domain resource location, and a time offset of the first PUSCH resource configuration relative to the first RO time-domain resource location is a first time offset; the second PUSCH resource configuration corresponds to a second RO time-domain resource location, and a time offset of the second PUSCH resource configuration relative to the second RO time-domain resource location is a second time offset; the third PUSCH resource configuration corresponds to a third RO time-domain resource location, and a time offset of the third PUSCH resource configuration relative to the third RO time-domain resource location is a third time offset; and the fourth PUSCH resource configuration corresponds to a fourth RO time-domain resource location, and a time offset of the fourth PUSCH resource configuration relative to the fourth RO time-domain resource location is a fourth time offset; wherein the first time offset, the second time offset, the third time offset, and the fourth time offset are different from each other, and wherein the first PUSCH resource configuration is mapped to the first time-domain RO, the second PUSCH resource configuration is mapped to the second time-domain RO, the third PUSCH resource configuration is mapped to the third time-domain RO, and the fourth PUSCH resource configuration is mapped to the fourth time-domain RO.

12. The terminal device of claim 11, wherein the N PUSCH resource configurations comprise:
 the N PUSCH resource configurations corresponding to a same modulation and coding scheme (MCS) and a same transport block size (TBS); and
 each RO time-domain resource location determined by the PRACH time-domain resource configuration corresponds to one of the N PUSCH resource configurations in the correspondence.

13. The terminal device of claim 11, wherein the computer program is further executed by the processor to cause the transceiver to:
 in response to reception of the first configuration information from the network device by the terminal device:
 transmit MSG A according to the first configuration information during RA; and
 receive a random access response (RAR) from the network device, wherein the RAR comprises an initial timing advance (TA) of the terminal device.

14. The terminal device of claim 13, wherein the initial TA is obtained by performing the following operations by the network device:
 determining a PRACH time-domain resource that is used by the terminal device to transmit a preamble of the MSG A, according to a frequency-domain resource location of a PUSCH for receiving the MSG A and the correspondence;
 determining a random access radio network temporary identifier (RA-RNTI) for the terminal device according to the PRACH time-domain resource used; and
 determining the TA of the terminal device according to a point of time at which the terminal device transmits the preamble and a point of time at which the network device receives the preamble; or
the initial TA is obtained by performing the following operations by the network device:
 determining a PRACH time-domain resource that is used by the terminal device to transmit a preamble of the MSG A, according to a time offset of a PUSCH for receiving the MSG A relative to a PRACH for receiving the MSG A;
 determining an RA-RNTI for the terminal device according to the PRACH time-domain resource used; and
 determining the TA of the terminal device according to a point of time at which the terminal device transmits the preamble and a point of time at which the network device receives the preamble; or
the initial TA is obtained by performing the following operations by the network device:
 determining a PRACH time-domain resource that is used by the terminal device to transmit a preamble of the MSG A, according to a DMARS sequence corresponding to a PUSCH for receiving the MSG A and the correspondence;
 determining an RA-RNTI for the terminal device according to the PRACH time-domain resource used; and
 determining the TA of the terminal device according to a point of time at which the terminal device transmits the preamble and a point of time at which the network device receives the preamble.

15. The terminal device of claim 11, wherein the N PUSCH resource configurations comprise:
 a value of N depending on the length of the preamble receiving window and an RACH-resource distribution density in a time domain; and
 each RO time-domain resource location determined by the PRACH time-domain resource configuration corresponds to one of the N PUSCH resource configurations in the correspondence.

* * * * *